United States Patent
So et al.

(10) Patent No.: US 11,648,563 B2
(45) Date of Patent: May 16, 2023

(54) METHOD AND SYSTEM FOR HEATING AND TEMPERATURE MEASUREMENT USING PATTERNED THIN FILMS

(71) Applicant: Kryptos Biotechnologies, Inc., Hayward, CA (US)

(72) Inventors: Austin So, Pleasanton, CA (US); Jun Ho Son, Albany, CA (US)

(73) Assignee: Kryptos Biotechnologies, Inc., Hayward, CA (US)

( * ) Notice: Subject to any disclaimer, the term of this patent is extended or adjusted under 35 U.S.C. 154(b) by 413 days.

(21) Appl. No.: 16/719,289

(22) Filed: Dec. 18, 2019

(65) Prior Publication Data

US 2020/0197927 A1 Jun. 25, 2020

Related U.S. Application Data

(60) Provisional application No. 62/783,949, filed on Dec. 21, 2018.

(51) Int. Cl.
*B01L 3/00* (2006.01)
*G01K 7/16* (2006.01)

(52) U.S. Cl.
CPC ............... *B01L 3/508* (2013.01); *G01K 7/16* (2013.01); *B01L 2300/06* (2013.01); *B01L 2300/0883* (2013.01); *B01L 2300/12* (2013.01)

(58) Field of Classification Search
CPC .............. B01L 3/502715; B01L 7/00; B01L 2200/027; B01L 2200/04; B01L 2200/10;
(Continued)

(56) References Cited

U.S. PATENT DOCUMENTS

| | | | | |
|---|---|---|---|---|
| 2004/0100594 A1* | 5/2004 | Huibers | ............... | H04N 5/7458 348/E5.142 |
| 2004/0201848 A1* | 10/2004 | Codner | ................ | G01N 21/553 356/445 |

(Continued)

FOREIGN PATENT DOCUMENTS

| | | |
|---|---|---|
| EP | 1349658 A1 | 10/2003 |
| WO | 2012015165 | 2/2012 |

(Continued)

OTHER PUBLICATIONS

PCT/US2019/067272, "International Preliminary Report on Patentability", dated Jul. 1, 2021, 9 pages.
(Continued)

*Primary Examiner* — Benjamin R Whatley
*Assistant Examiner* — Jacqueline Brazin
(74) *Attorney, Agent, or Firm* — Kilpatrick Townsend & Stockton LLP

(57) ABSTRACT

This disclosure describes a reaction vessel assembly that includes the following: a reaction vessel including a housing component; a reaction chamber defined by the housing component; and a light absorbing layer conforming to a portion of an interior-facing surface of the housing component that defines the reaction chamber, the light absorbing layer comprising a multiple discrete regions; and an energy source configured to direct light through at least a portion of the housing component at one or more of the discrete regions of the light absorbing layer.

20 Claims, 24 Drawing Sheets

(58) Field of Classification Search
CPC ......... B01L 2200/16; B01L 2300/0861; B01L 3/508; B01L 2300/06; B01L 2300/0883; B01L 2300/12; B01L 7/525; B01L 2200/147; B01L 2300/0645; B01L 2300/168; B01L 2300/1861; B01L 2400/086; B01L 2400/088; C12N 15/1003; G01K 7/16; B01J 2219/00934; B01J 2219/00961
USPC ........................................ 436/178; 422/82.01
See application file for complete search history.

(56) References Cited

U.S. PATENT DOCUMENTS

| | | | |
|---|---|---|---|
| 2007/0116444 A1* | 5/2007 | Brown | B01L 7/525 |
| | | | 392/467 |
| 2007/0238202 A1* | 10/2007 | Ranish | H01L 22/12 |
| | | | 257/E21.53 |
| 2014/0073013 A1* | 3/2014 | Gorman | B01L 7/52 |
| | | | 435/91.2 |
| 2015/0328633 A1 | 11/2015 | Yoo | |
| 2018/0080064 A1 | 3/2018 | Lee et al. | |
| 2018/0221883 A1 | 8/2018 | Ou et al. | |
| 2018/0236451 A1 | 8/2018 | Lee et al. | |

FOREIGN PATENT DOCUMENTS

| | | | | |
|---|---|---|---|---|
| WO | WO-2012015165 A2 * | 2/2012 | | B01L 7/52 |
| WO | 2017127570 A1 | 7/2017 | | |
| WO | WO-2017156126 A1 * | 9/2017 | | B01L 3/50851 |

OTHER PUBLICATIONS

International Patent Application No. PCT/US2019/067272, "International Search Report and Written Opinion", dated Mar. 3, 2020, 11 pages.

Application No. EP19900069.6, Extended European Search Report, dated Dec. 19, 2022, 9 pages.

* cited by examiner

METHOD AND SYSTEM FOR HEATING AND TEMPERATURE MEASUREMENT USING PATTERNED THIN FILMS

CROSS-REFERENCES TO RELATED APPLICATIONS

This application claims the benefit of U.S. Provisional Patent Application No. 62/783,949, filed on Dec. 21, 2018, the disclosure of which is hereby incorporated by reference in its entirety for all purposes.

BACKGROUND OF THE INVENTION

Reaction vessels are often used to perform various operations on DNA strands that can include operations such as polymerase chain reaction (PCR) and DNA sequencing. Polymerase chain reaction (PCR) has become an essential technique in the fields of life sciences, clinical laboratories, agricultural science, environmental science, and forensic science. PCR requires thermal cycling or repeated temperature changes between two or three discrete temperatures, to amplify specific nucleic acid target sequences. To achieve such thermal cycling, conventional bench-top thermal cyclers generally use a metal heating block powered by Peltier elements. Unfortunately, this method of thermally cycling the materials within the reaction vessels can be slower than desired. For these reasons, alternate means that improve the speed and/or reliability of the thermal cycling are desirable.

SUMMARY OF THE INVENTION

This disclosure relates to methods and apparatus suitable for use with a reaction vessel.

In some embodiments, a reaction vessel assembly includes the following: a reaction vessel, including: a housing component; a reaction chamber defined by the housing component; and a light absorbing layer conforming to a portion of an interior-facing surface of the housing component that defines the reaction chamber, the light absorbing layer comprising an electrically conductive pathway; a first energy source (e.g., a light source such as an LED) configured to direct light through at least a portion of the housing component at a portion of the electrically conductive pathway; and a second energy source (e.g., an electrical source such as a DC source, an AC source, a battery, etc.) configured to direct electrical energy through the electrically conductive pathway.

In some embodiments, the reaction vessel assembly also includes a processor configured to determine a temperature within the reaction chamber based upon a voltage change (e.g., with a measured voltage drop) in the electrical energy after passing through the electrically conductive pathway. In some embodiments, the electrical energy is conducted through an entirety of the light absorbing layer. In other embodiments, the light absorbing layer includes a first layer in direct contact with the housing component and a second layer stacked atop the first layer that forms the electrically conductive pathway, wherein the first layer is electrically insulated from the second layer.

In some embodiments, the reaction vessel assembly includes a processor configured to determine a first temperature within the reaction chamber based upon a voltage change in the electrical energy after passing through the first electrically conductive pathway. In some embodiments, the electrical energy is directed through an entirety of the light absorbing layer.

In some embodiments, the processor is further configured to: compare the first temperature to a desired temperature; and in response to a result of said comparison, cause the light source to adjust an amount of light directed at the portion of the light absorbing layer. For example, the processor may determine that the first temperature is equal to or greater than the desired temperature. In response, the processor may cause the light source to stop directing light at the portion of the light absorbing layer. Alternatively, the processor may decrease an amount of light directed at the portion of the light absorbing layer (e.g., by decreasing power supplied to the light source). As another example, the processor may determine that the first temperature is less than the desired temperature, and in response may increase an amount of light directed at the portion of the light absorbing layer.

In some embodiments, the light absorbing layer comprises a first layer in direct contact with the housing component and a second layer stacked atop the first layer that forms the first electrically conductive pathway, wherein the first layer is electrically insulated from the second layer. In some embodiments, the first layer is electrically non-conductive.

In some embodiments, the reaction vessel assembly includes a second electrically conductive pathway separate and distinct from the first electrically conductive pathway. In some embodiments, the first electrically conductive pathway covers a first portion of the housing component and the second electrically conductive pathway covers a second portion of the housing component, and wherein the reaction vessel assembly further comprises a processor configured to determine a temperature of the first and second portions of the housing component based on respective measured voltage changes in electrical energy after passing through the first and second electrically conductive pathways.

In some embodiments, the first electrically conductive pathway has a serpentine geometry in which adjacent segments of the first electrically conductive pathway are separated by a gap less than half as wide as a width of each of the adjacent segments of the first electrically conductive pathway.

In some embodiments, the light absorbing layer is disposed along the surface of the housing component at a variable density. In some embodiments, the light absorbing layer is disposed at a relatively high density along a peripheral portion of the surface of the housing component, and at a relatively low density along a central portion of the surface of the housing component. In some embodiments, the light absorbing layer is disposed at a relatively low density along a peripheral portion of the surface of the housing component, and at a relatively high density along a central portion of the surface of the housing component. In some embodiments, the light absorbing layer comprises two or more discrete regions.

In some embodiments, a method of operating a reaction vessel assembly including a reaction vessel with a reaction chamber defined by a housing component may include directing light from a light source through at least a portion of the housing component at a portion of the light absorbing layer to cause the light absorbing layer to convert the light into heat energy, wherein the light absorbing layer comprises a first electrically conductive pathway; directing, by an electrical energy source, electrical energy through the first electrically conductive pathway; measuring a voltage change across the first electrically conductive pathway; and determining a first temperature within the reaction chamber based upon a voltage change in the electrical energy after passing through the first electrically conductive pathway.

In some embodiments, the electrical energy is directed through an entirety of the light absorbing layer. In some embodiments, the light absorbing layer is disposed along the surface of the housing component at a variable density. In some embodiments, the light absorbing layer is disposed at a relatively high density along a peripheral portion of the surface of the housing component, and at a relatively low density along a central portion of the surface of the housing component. In some embodiments, the light absorbing layer is disposed at a relatively low density along a peripheral portion of the surface of the housing component, and at a relatively high density along a central portion of the surface of the housing component.

In some embodiments, the method includes comparing the first temperature to a desired temperature; and in response to a result of said comparison, causing the light source to adjust an amount of light directed at the portion of the light absorbing layer. For example, the processor may determine that the first temperature is equal to or greater than the desired temperature. In response, the processor may cause the light source to stop directing light at the portion of the light absorbing layer. Alternatively, the processor may decrease an amount of light directed at the portion of the light absorbing layer (e.g., by decreasing power supplied to the light source). As another example, the processor may determine that the first temperature is less than the desired temperature, and in response may increase an amount of light directed at the portion of the light absorbing layer.

In some embodiments, a reaction vessel assembly includes a reaction vessel, wherein the reaction vessel includes: a reaction chamber; and an energy absorbing layer disposed along the reaction chamber, the energy absorbing layer comprising a first electrically conductive pathway. The reaction vessel assembly may also include an energy source configured to direct energy at a portion of the energy absorbing layer; an electrical energy source configured to direct electrical energy through the first electrically conductive pathway; and a processor. The processor may be configured to: determine a first temperature within the reaction chamber based upon a voltage change of the electrical energy after passing through the first electrically conductive pathway; determine that the first temperature is equal to or greater than a desired temperature; and in response to said determination, cause the energy source to stop directing energy at the portion of the energy absorbing layer.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF THE INVENTION

Figure 1A:
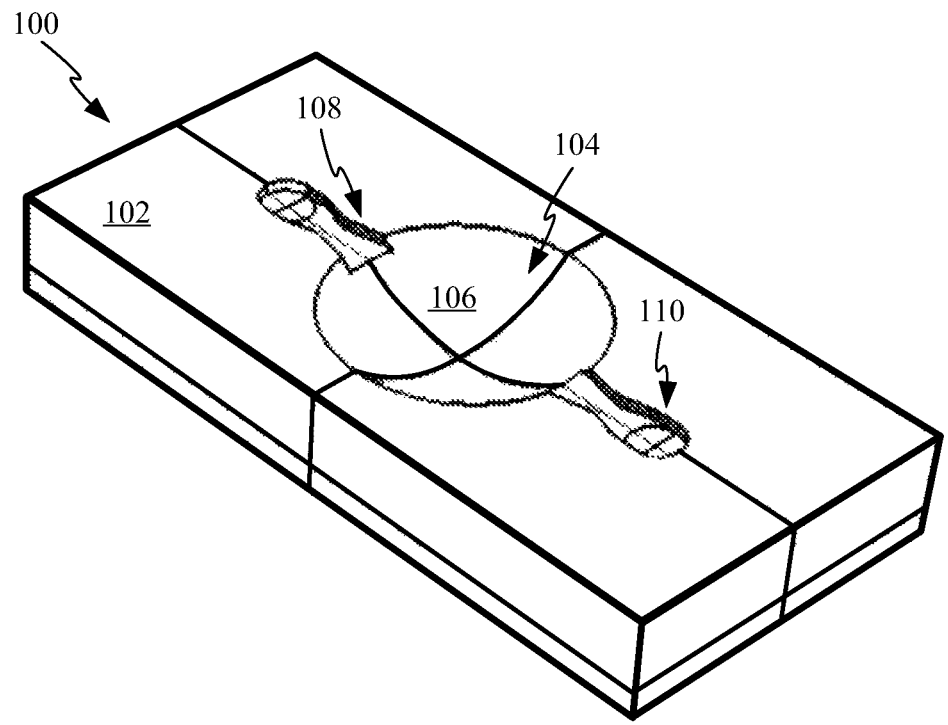
FIG. 1A shows an exemplary reaction vessel suitable for use with the described embodiments.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Microfluidics systems or devices have widespread use in chemistry and biology. In such devices, fluids are transported, mixed, separated or otherwise processed. In many microfluidics devices, various applications rely on passive fluid control using capillary forces. In other applications, external actuation means (e.g., rotary drives) are used for the directed transport of fluids. "Active microfluidics" refers to the defined manipulation of the working fluid by active (micro) components such as micropumps or microvalves. Micropumps supply fluids in a continuous manner or are used for dosing. Microvalves determine the flow direction or the mode of movement of pumped liquids. Processes that are normally carried out in a laboratory can be miniaturized on a single chip in order to enhance efficiency and mobility as well to reduce sample and reagent volumes. Microfluidic structures can include micropneumatic systems, i.e., microsystems for the handling of off-chip fluids (liquid pumps, gas valves, etc.), and microfluidic structures for the on-chip handling of nanoliter (nl) and picoliter (pl) volumes (Nguyen and Wereley, Fundamentals and Applications of Microfluidics, Artech House, 2006).

Advances in microfluidics technology are revolutionizing molecular biology procedures for enzymatic analysis (e.g., glucose and lactate assays), DNA analysis (e.g., polymerase chain reaction and high-throughput sequencing), and proteomics. Microfluidic biochips integrate assay operations such as detection, as well as sample pre-treatment and sample preparation on one chip (Herold and Rasooly, editors, Lab-on-a-Chip Technology: Fabrication and Microfluidics, Caister Academic Press, 2009; Herold and Rasooly, editors, Lab-on-a-Chip Technology: Biomolecular Separation and Analysis, Caister Academic Press, 2009). An emerging application area for biochips is clinical pathology, especially the immediate point-of-care diagnosis of diseases. In addition, some microfluidics-based devices are capable of continuous sampling and real-time testing of air/water samples for biochemical toxins and other dangerous pathogens.

Many types of microfluidic architectures are currently in use and include open microfluidics, continuous-flow microfluidics, droplet-based microfluidics, digital microfluidics, paper-based microfluidics and DNA chips (microarrays).

In open microfluidics, at least one boundary of the system is removed, exposing the fluid to air or another interface (i.e., liquid) (Berthier et al., Open microfluidics, Hoboken, N.J.: Wiley, Scrivener Publishing, 2016; Pfohl et al., Chem Phys Chem. 4:1291-1298, 2003; Kaigala et al., Angewandte Chemie International Edition. 51:11224-11240, 2012). Advantages of open microfluidics include accessibility to the flowing liquid for intervention, larger liquid-gas surface area, and minimized bubble formation (Berthier et al., Open microfluidics, Hoboken, N.J.: Wiley, Scrivener Publishing, 2016; Kaigala et al., Ange. Chemie Int. Ed. 51:11224-11240, 2012; Li et al., Lab on a Chip 17: 1436-1441). Another advantage of open microfluidics is the ability to integrate open systems with surface-tension driven fluid flow, which eliminates the need for external pumping methods such as peristaltic or syringe pumps (Casavant et al., Proc. Nat. Acad. Sci. USA 110:10111-10116, 2013). Open microfluidic devices are also inexpensive to fabricate by milling, thermoforming, and hot embossing (Guckenberger et al., Lab on a Chip, 15: 2364-2378, 2015; Truckenmuller et al., J. Micromechanics and Microengineering, 12: 375-379, 2002; Jeon et al., Biomed. Microdevices 13: 325-333, 2010; Young et al., Anal. Chem. 83:1408-1417, 2011). In addition, open microfluidics eliminates the need to glue or bond a cover for devices which could be detrimental for capillary flows. Examples of open microfluidics include open-channel microfluidics, rail-based microfluidics, paper-based, and thread-based microfluidics (Berthier et al., Open microfluidics, Hoboken, N.J.: Wiley, Scrivener Publishing, 2016; Casavant et al., Proc. Nat. Acad. Sci. USA 110:10111-10116, 2013; Bouaidat et al., Lab on a Chip 5: 827, 2005).

Continuous flow microfluidics are based on the manipulation of continuous liquid flow through microfabricated channels (Nguyen et al., Micromachines 8:186, 2017; Antfolk and Laurell, Anal. Chim. Acta 965:9-35, 2017). Actuation of liquid flow is implemented either by external pressure sources, external mechanical pumps, integrated mechanical micropumps, or by combinations of capillary forces and electrokinetic mechanisms. Continuous-flow devices are useful for many well-defined and simple biochemical applications and for certain tasks such as chemical separations, but they are less suitable for tasks requiring a high degree of flexibility or fluid manipulations. Process monitoring capabilities in continuous-flow systems can be achieved with highly sensitive microfluidic flow sensors based on micro-electro-mechanical systems (MEMS) technology, which offers resolutions down to the nanoliter range.

Droplet-based microfluidics manipulates discrete volumes of fluids in immiscible phases with low Reynolds number and laminar flow regimes (see reviews at Shembekar et al., Lab on a Chip 8:1314-1331, 2016; Zhao-Miao et al., Chinese J. Anal. Chem. 45:282-296, 2017. Microdroplets allow for the manipulation of miniature volumes (μl to fl) of fluids conveniently, provide good mixing, encapsulation, sorting, and sensing, and are suitable for high throughput applications (Chokkalingam et al., Lab on a Chip 13:4740-4744, 2013).

Alternatives to closed-channel continuous-flow systems include open structures, wherein discrete, independently controllable droplets are manipulated on a substrate using electrowetting. By using discrete unit-volume droplets (Chokkalingam et al., Appl. Physics Lett. 93:254101, 2008), a microfluidic function can be reduced to a set of repeated basic operations, i.e., moving one unit of fluid over one unit of distance. This "digitization" method facilitates the use of a hierarchical, cell-based approach for microfluidic biochip design. Therefore, digital microfluidics offers a flexible, scalable system architecture as well as high fault-tolerance. Moreover, because each droplet can be controlled independently, these systems also have dynamic reconfigurability, whereby groups of unit cells in a microfluidic array can be reconfigured to change their functionality during the concurrent execution of a set of bioassays. Alternatively, droplets can be manipulated in confined microfluidic channels. One common actuation method for digital microfluidics is electrowetting-on-dielectric (EWOD) (reviewed in Nelson and Kim, J. Adhesion Sci. Tech., 26:12-17, 1747-1771, 2012). Many lab-on-a-chip applications have been demonstrated within the digital microfluidics paradigm using electrowetting. However, recently other techniques for droplet manipulation have also been demonstrated using magnetic force (Zhang and Nguyen, Lab on a Chip 17.6: 994-1008, 2017), surface acoustic waves, optoelectrowetting, mechanical actuation (Shemesh et al., Biomed. Microdevices 12:907-914, 2010), etc.

Paper-based microfluidics (Berthier et al., Open Microfluidics, John Wiley & Sons, Inc. pp. 229-256, 2016) rely on the phenomenon of capillary penetration in porous media. In order to tune fluid penetration in porous substrates such as paper in two and three dimensions, the pore structure, wettability and geometry of the microfluidic devices can be controlled, while the viscosity and evaporation rate of the liquid play a further significant role. Many such devices feature hydrophobic barriers on hydrophilic paper that passively transport aqueous solutions to outlets where biological reactions take place (Galindo-Rosales, Complex Fluid-Flows in Microfluidics, Springer, 2017).

Early biochips were based on the idea of a DNA microarray, e.g., the GeneChip DNA array from Affymetrix, which is a piece of glass, plastic or silicon substrate on which DNA molecules (probes) are affixed in an array. Similar to a DNA microarray, a protein array is an array in which a multitude of different capture agents, e.g., monoclonal antibodies, are deposited on a chip surface. The capture agents are used to determine the presence and/or amount of proteins in a biological sample, e.g., blood. For a review, see, e.g., Bumgarner, Curr. Protoc. Mol. Biol. 101:22.1.1-22.1.11, 2013.

In addition to microarrays, biochips have been designed for two-dimensional electrophoresis, transcriptome analysis, and PCR amplification. Other applications include various electrophoresis and liquid chromatography applications for proteins and DNA, cell separation, in particular, blood cell separation, protein analysis, cell manipulation and analysis including cell viability analysis and microorganism capturing.

Reaction vessels are often used to perform various types of operations on DNA strands that include polymerase chain reactions (PCR) and DNA sequencing. Reaction vessels can incorporate one or more of the microfluidic architectures listed above but it should be appreciated that reaction vessels can be larger than microfluidics devices and for that reason may not incorporate any of the microfluidic architectures describes above. Operations of the reaction vessels often include the need to make rapid changes in temperature within the reaction vessel. For example, a PCR operation solution containing DNA strands is positioned within a reaction chamber defined by the reaction vessel. A heating element is used to thermally cycle the solution in order to breakdown and/or build up different types of DNA. Unfortunately, conventional means of thermally cycling the solution are often slower than desired and not capable of varying a temperature of specific regions of a reaction chamber within the reaction vessel.

One solution to this problem is to position a light absorbing layer within the reaction chamber of the reaction vessel with light absorption characteristics that allow absorption of between 50 and 90% of the photonic energy in any light absorbed by the light absorbing layer. An energy source can be configured to direct light at the light absorbing layer, which efficiently absorbs energy from photons of the light directed at the light absorbing layer. The absorption of the photonic energy rapidly increases the temperature of the light absorbing layer. This energy received by the light absorbing layer is then transferred to a solution within the reaction chamber by thermal conduction.

In some embodiments, the light absorbing layer is divided into discrete regions. Dividing the light absorbing layer into discrete regions has the following advantages: (1) patterning the discrete regions into different shapes and thicknesses allows a specific spatial heating profile to be achieved within the reaction chamber of the reaction vessel; (2) optical sensors are able to take readings of solution within the reaction chamber through gaps between the discrete regions; and (3) an array of energy sources can be used to add different amounts of energy to each of the discrete regions of the light absorbing layer, thereby allowing solution within a first region of the reaction chamber to have a substantially different temperature than solution within a second region of the reaction chamber.

In some embodiments, the light absorbing layer can be patterned as a serpentine or meandering electrically conductive pathway that covers a majority of a light absorbing surface of the reaction vessel. A temperature of the reaction vessel can be continuously monitored by routing electrical current through this electrically conductive pathway. A resistance of this electrically conductive pathway to electricity can be correlated with a temperature of the reaction chamber. In this way, the light absorbing layer is operative to convert photonic energy into heat energy within the reaction vessel and monitor a temperature of the reaction vessel. In some embodiments, the temperature data derived from the measured electrical resistance can be used to perform feedback control of the amount of photonic energy directed at the light absorbing layer to achieve a desired thermal profile within the reaction chamber. In some embodiments, the reaction chamber can include a first light absorbing layer patterned as an electrically conductive pathway and a second light absorbing layer that operates only to heat material within the reaction vessel. In some embodiments, the first and second layers can have substantially conformal shapes that prevent the presence of large gaps between the layers that could lead to uneven heating of the reaction chamber.

These and other embodiments are discussed below with reference to FIGS. 1A-10; however, those skilled in the art will readily appreciate that the detailed description given herein with respect to these figures is for explanatory purposes only and should not be construed as limiting. More information about various aspects of light absorbing layers, reaction vessels, and the monitoring of the reaction vessels is disclosed in U.S. patent application Ser. No. 16/653,734, filed Oct. 15, 2019; and U.S. patent application Ser. No. 16/654,462, filed Oct. 16, 2019; the disclosures of which are hereby incorporated by reference in their entirety for all purposes.

FIG. 1A shows a perspective view of an exemplary reaction vessel 100 suitable for use with the described embodiments. In particular, the reaction vessel 100 includes a housing component 102 formed from an optically transparent material that defines a reaction chamber 104. While reaction chamber 104 is depicted as having a substantially circular geometry it should be appreciated that the depicted shape of reaction chamber 104 should not be construed as limiting and other shapes such as oval, rhombic and rectangular are also possible. In some embodiments, the optically transparent material forming housing component 102 can be optically transparent to only those wavelengths of light that are used to heat reaction vessel 100. For example, the optically transparent material could be optically transparent to only select visible, infrared or ultraviolet frequencies of light. Reaction chamber 104 can be closed by a second housing component (not depicted) that encloses a liquid being heated within reaction chamber 104. In this way, DNA strands in a liquid solution within reaction chamber 104 can undergo rapid thermal cycles and at least a portion of any vaporized portion of the solution can subsequently condense back into the solution between the thermal cycles or after the thermal cycling is complete. A light absorbing layer 106 can be plated onto or otherwise adhered to an interior-facing surface of the reaction chamber 104. Light absorbing layer 106 has good light absorbing properties and can be in direct contact with any liquid disposed within reaction chamber 104. For example, light absorbing layer 106 can be configured to absorb about 50-90% of the photonic energy incident to light absorbing layer 106. In some embodiments, light absorbing layer 106 can be a metal film formed from elemental gold, chromium, titanium, germanium or a gold alloy such as, e.g., gold-germanium, gold-chromium, gold-titanium, gold-chromium-germanium, and gold-titanium-germanium. In some embodiments, light absorbing layer 106 can be a multilayer metal film formed from elemental gold, chromium, titanium, germanium or a gold alloy such as, e.g., gold-germanium, gold-chromium, gold-titanium, gold-chromium-germanium, and gold-titanium-germanium. Light absorbing layer 106 can have a thickness of about 5 nm-200 nm. Housing component 102 also defines inlet channel 108 and outlet channel 110, which can be used to cycle various chemicals, primers, DNA strands, and other biological materials into and out of reaction chamber 104. In some embodiments, housing component 152 can have dimensions of about 7 mm by 14 mm; however, it should be appreciated that this size can vary.

Figure 1B:
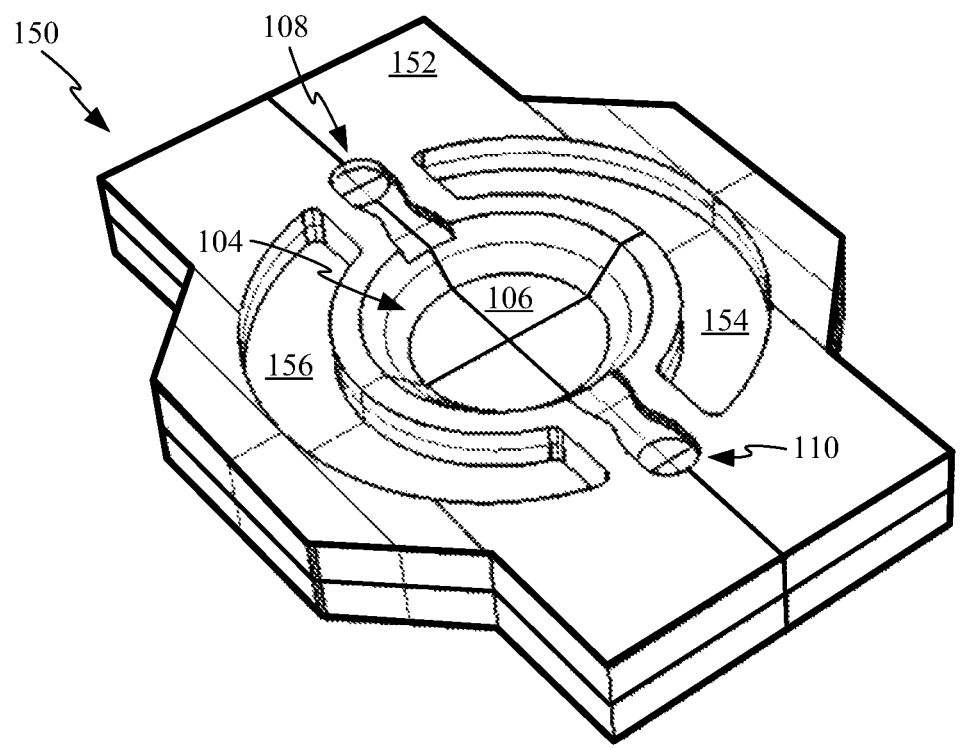
FIG. 1B shows another exemplary reaction vessel suitable for use with the described embodiments.

FIG. 1B shows a perspective view of another exemplary reaction vessel 150. The reaction vessel 150, similar to the reaction vessel 100 includes housing component 152, reaction chamber 104, light absorbing layer 106, the inlet channel 108 and outlet channel 110. Housing component 152 includes a widened central region that accommodates the inclusion of air gap regions 154 and 156. Air gap regions 154 and 156 can be left empty in order to discourage the lateral transmission of heat to adjacent reaction vessels. In some embodiments, the transfer of heat through air gap regions 154 and 156 can be further reduced by removing the air from air gap regions 154 and 156. In some embodiments, a diameter of housing component 152 can be about 5 mm; however, it should be appreciated that this size can vary. For example, the diameter of housing component 152 could vary from 2 mm to 15 mm.

Figure 1C:
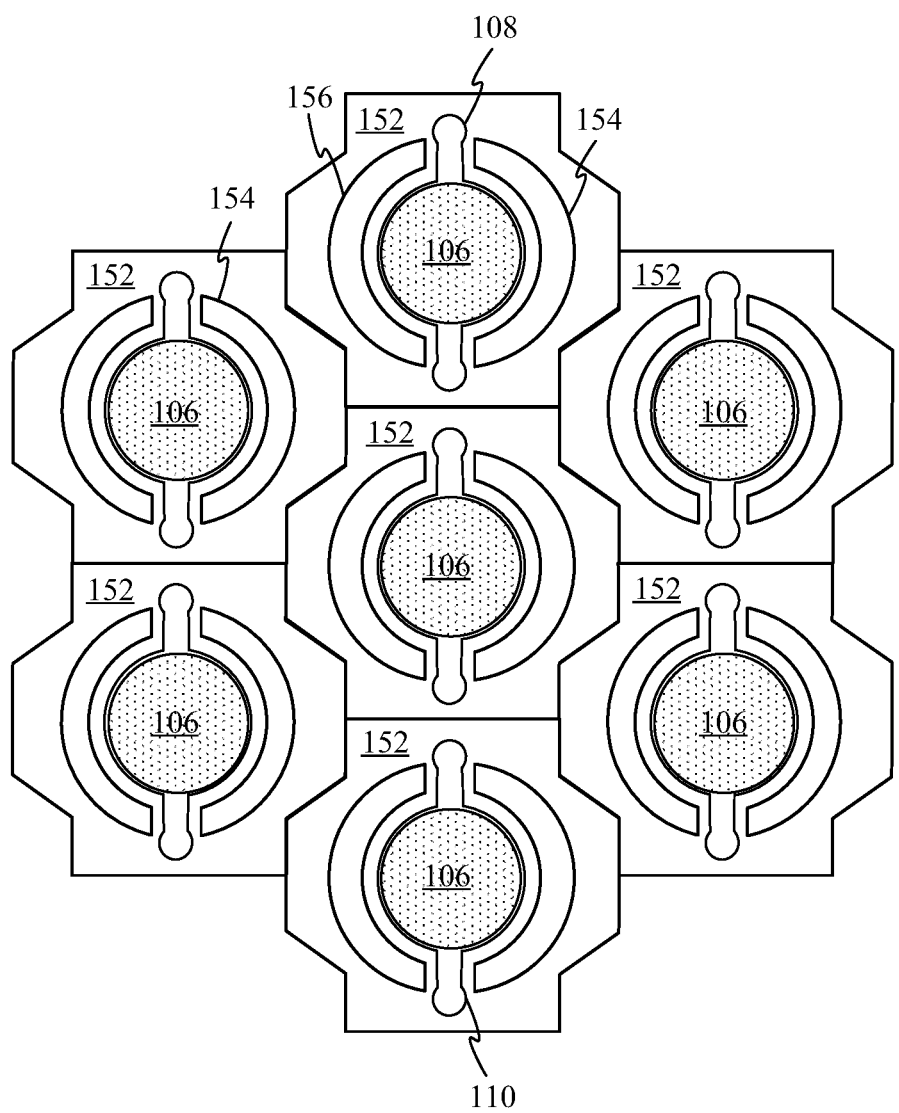
FIG. 1C shows how air gap regions establish robust barriers that reduce the lateral transfer of heat between adjacent reaction vessels.

FIG. 1C shows how the shape of housing component 152 allows reaction vessels 150 to be packed tightly into a honeycomb or hexagonal pattern. FIG. 1C also illustrates how air gap regions 154 and 156 are able to establish robust barriers that reduce the lateral transfer of heat between adjacent reaction vessels 150. When a diameter of the reaction vessel 150 is about 5 mm reaction chamber 104 can behold about 10 ul of solution and have a depth of 800 um. Generally, these devices are configured to hold between 2.5 ul and 500 ul with a depth of 200-1500 um.

Figure 2:
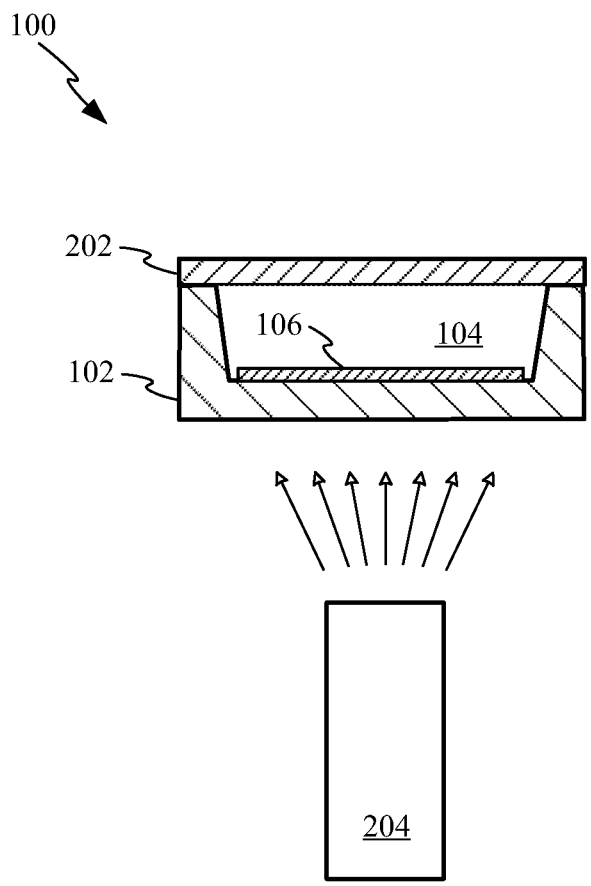
FIG. 2 shows a schematic cross-sectional side view of a reaction vessel and how reaction chamber can be closed.

FIG. 2 shows a schematic cross-sectional side view of a reaction vessel 100 and how reaction chamber 104 defined by housing component 102 can be closed by housing component 202, which can take the form of a cap. In some embodiments, housing components 102 and 202 can be sealed together to prevent contamination and allow for control of other factors such as pressure within reaction chamber 104. FIG. 2 also shows energy source 204, which is configured to project light upon light absorbing layer 106. A frequency of the light projected by energy source 204 can vary. In some embodiments, energy source 204 can take the form of a light emitting diode configured to emit light with a wavelength of 450 nm, a power of 890 mW and current of a 700 mA. When light absorbing layer 106 is illuminated by an energy source, a large temperature difference between the hot metal surface and the cooler surrounding solution disposed within reaction chamber 104 occurs, resulting in the heating of the surrounding solution. When the energy source stops illuminating light absorbing layer 106, the resulting rapid cooling of the light absorbing layer 106 helps facilitate rapid cooling of the heated solution.

Figure 3A:
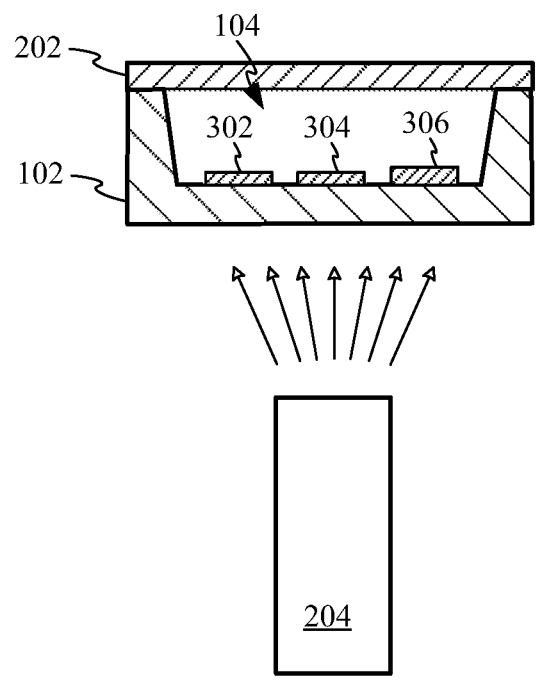
FIG. 3A shows a cross-sectional side view of a reaction vessel and how a light absorbing layer can be separated into discrete regions.

FIG. 3A shows a cross-sectional side view of reaction vessel 100 and how light absorbing layer 106 can be separated into discrete regions 302, 304 and 306. In some embodiments, these discrete regions can be set up to help establish a targeted amount of energy into reaction chamber 104. The gaps between discrete regions 302, 304 and 306 reduce a total surface area across which light is received from energy source 204 compared with a light absorbing layer that extends across an entire bottom surface of the reaction chamber 104. Increasing or decreasing the size of the gaps between discrete regions 302, 304 and 306 can be used to tune the energy input into reaction chamber 104. A total area in contact with solution within reaction chamber 104 is also reduced, thereby reducing an efficiency of the transfer of heat from discrete regions 302, 304 and 306 to the solution. Gaps between discrete regions 302, 304 and 306 also allow for optical monitoring of solution within reaction chamber 104. Gaps between discrete regions 302, 304 and 306 may not be uniform in size allowing for some discrete regions within reaction chamber 104 to be heated substantially more than other discrete regions. Furthermore, discrete region 306 can be thicker than discrete regions 302 and 304, thereby increasing the efficiency with which heat can be drawn into reaction chamber 104 proximate discrete region 306.

Figure 3B:
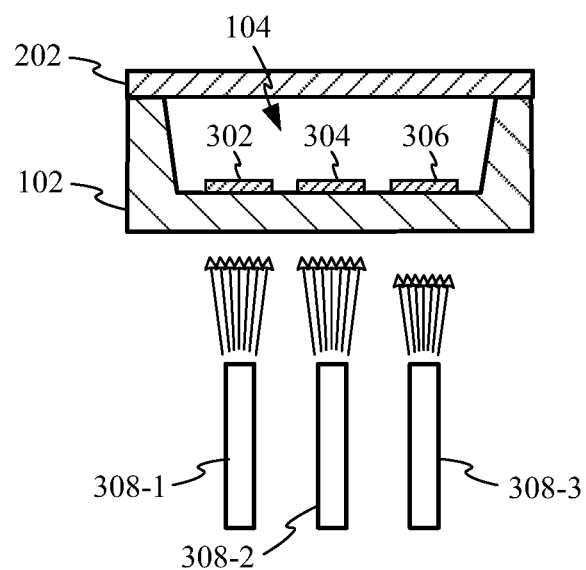
FIGS. 3B-3C show cross-sectional side views of a reaction vessel being illuminated by an array of energy sources.

FIG. 3B shows a cross-sectional side view of reaction vessel 100 being illuminated by an array of energy sources 308. Using an array of energy sources 308 can reduce an amount of light extending between discrete regions 302-306 by allowing energy sources 308 to be focus energy only on discrete regions 302-306. In some embodiments, energy sources 308 may include specialized focusing optics to specifically target one of the discrete regions 302, 304 or 306. Each energy source 308 of the array of energy sources 308 can be controlled separately to create a desired gradient of heat within reaction chamber 104. For example, different types of biological material can be attached proximate or directly on top of a particular one of the discrete regions 302-306. Because energy sources 308 can be controlled individually, the materials associated with a particular discrete region can be heated in accordance with a customized heating profile. For example, biological material proximate discrete region 306 could have a substantially lower denaturing temperature than the biological material proximate discrete region 302. By operating energy source 308-1 at a higher power level than the energy source 308-3 a desired denaturing temperature can be achieved for both types of biological material.

Figure 3C:
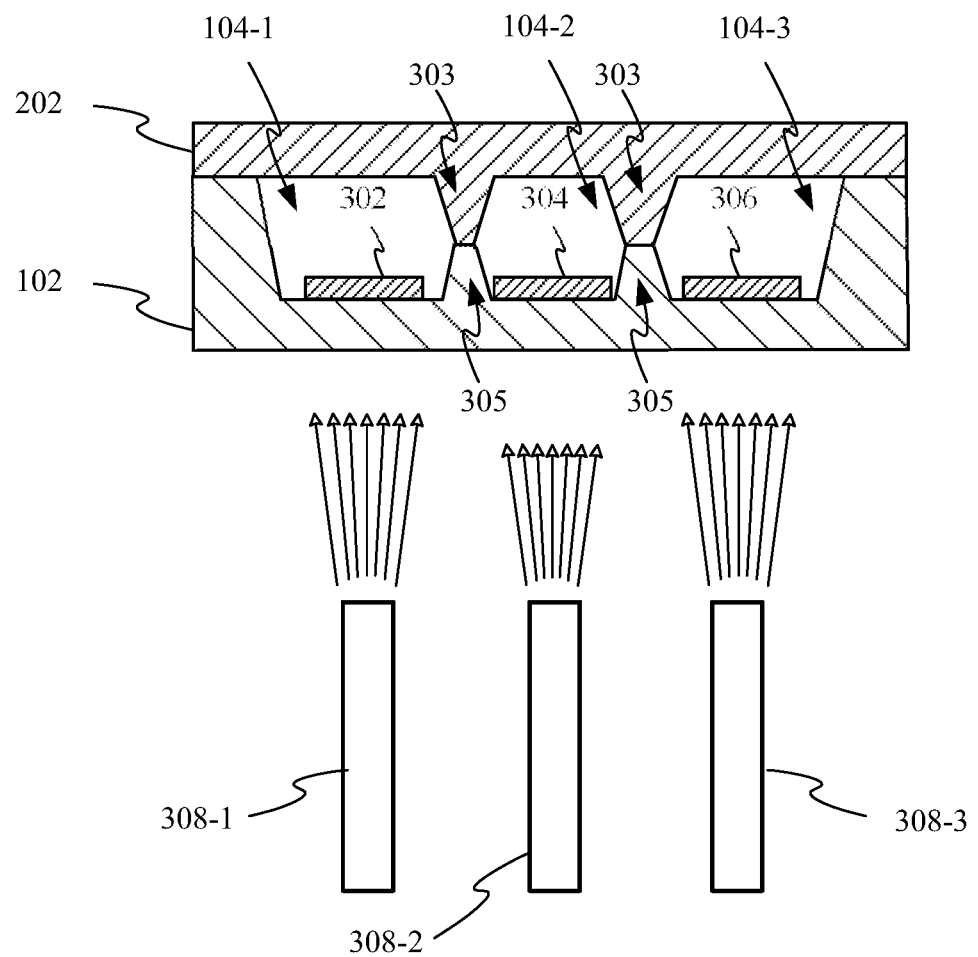

FIG. 3C shows a cross-sectional side view of reaction vessel 100 being illuminated by an array of energy sources 308. FIG. 3C shows how housing component 202 can include multiple protrusions or ridges 303 that meet protrusions or ridges 305 of housing component 102 to divide reaction chamber 104 into multiple smaller reaction chambers 104-1, 104-2 and 104-3. In this way, the solution within reaction chamber 104 can be separated, further improving the thermal isolation enabled by discrete regions 302, 304 and 306. While both housing components 202 and 102 are shown including respective protrusions 303 and 305, it should be appreciated that in some embodiments, protrusions 303 could extend all the way to a flat interior-facing surface of housing component 102 or protrusions 305 could extend all the way to a flat interior-facing surface of housing component 202. In some embodiments, the reaction vessel 100 could include multiple different housing components 202 with different configurations of protrusions 303. For example, a housing component 202 with no protrusions could allow reactions to be carried out with a single reaction chamber 104 and in subsequent experiments or operations, the depicted housing component 202 with protrusions 303 could divide the reaction chamber into multiple smaller reaction chambers as depicted. In other embodiments, housing component 202 could include a configuration of protrusions 303 that defined different sized reaction chambers 104. For example, housing component 202 could include only one protrusion 303 defining one reaction chamber 104 that includes discrete regions 302 and 304 and then another reaction chamber 104 that includes only discrete region 306. It should be appreciated that protrusions 303 and/or 305 can include sealing elements at their distal ends that help prevent the passage of solution between adjacent reaction chambers 104.

Figure 3D:
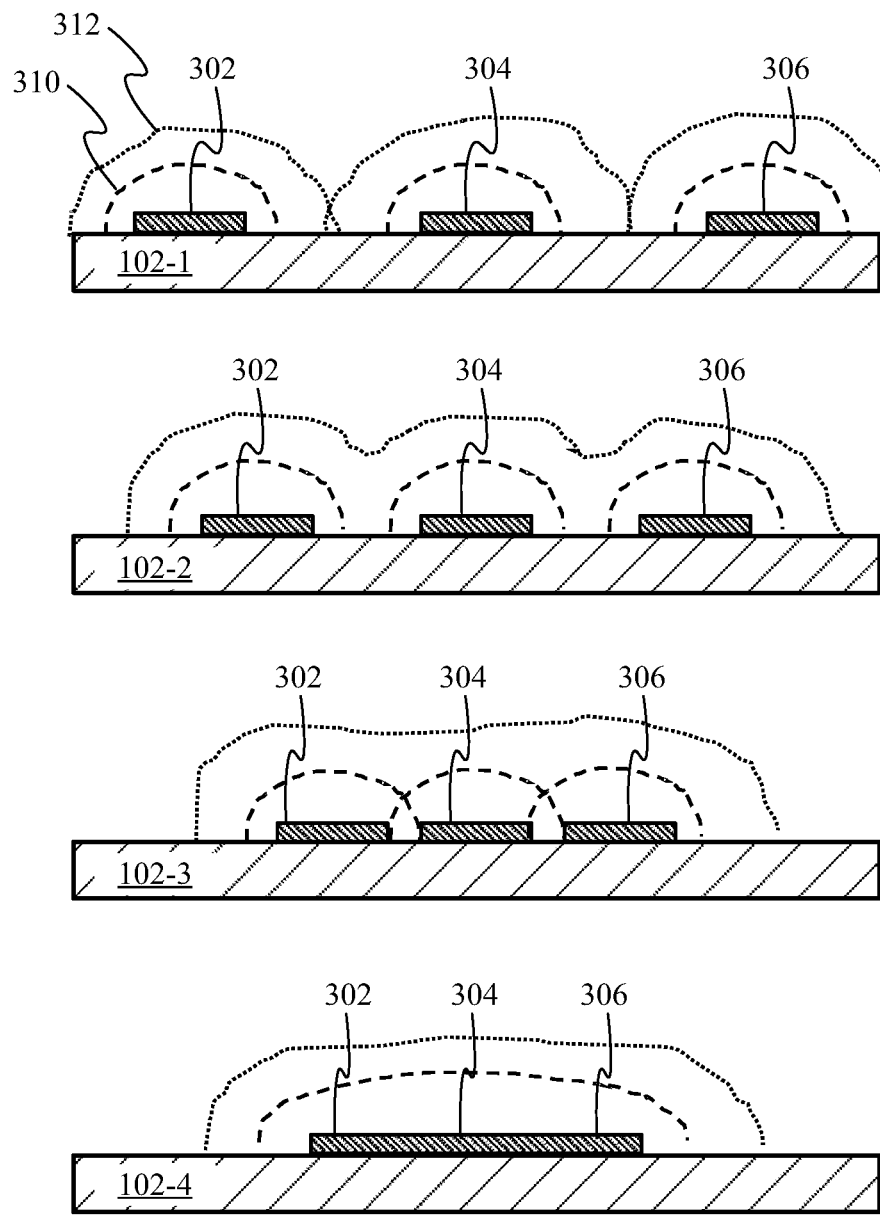
FIG. 3D shows a cross-sectional side view of a thermal profile of a portion of a reaction vessel with different sized gaps between discrete regions of a light absorbing layer.

FIG. 3D shows a cross-sectional side view of a thermal profile of a portion of a reaction vessel with different sized gaps between discrete regions 302, 304 and 306 of a light absorbing layer. In particular, housing component 102 is depicted with four different discrete region configurations, which are differentiated by the labels housing component 102-1, 102-2, 102-3 and 102-4. These configurations depict two sets of contours indicative of an amount of energy or temperature change taking place in portions of the solution adjacent to discrete regions 302-306. In particular, these depictions show how adjusting a gap size between adjacent discrete regions can improve or change a uniformity of the heating applied to a solution within a reaction chamber. Housing component 102-4 shows only a large single discrete region or alternatively, a discrete region made up of regions 302, 304 and 306 in abutting contact with one another such that they effectively form a single discrete region. It should be noted that while placing discrete regions 302-306 in abutting contact yields the largest heated area in a central portion of housing component 102-4, the peripheral ends of housing component 102 can fall below a desired temperature in some embodiments.

Figure 4A:
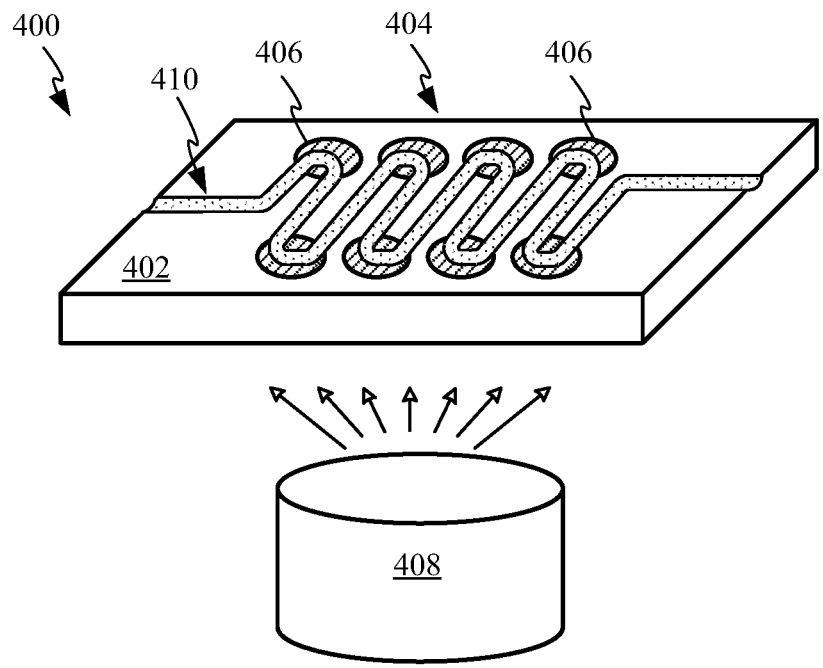
FIG. 4A shows a schematic perspective view of a reaction vessel having a reaction chamber taking the form of a serpentine channel.

FIG. 4A shows a schematic perspective view of a reaction vessel 400 that includes housing component 402. Housing component 402 includes a light absorbing layer 404 distributed into multiple discrete regions 406 configured to receive optical radiation from energy source 408 for the localized heating of solution disposed within reaction vessel 400. Housing component 402 has a reaction chamber taking the form of a serpentine channel through which solution can flow through each of the discrete regions 406. The flow of solution through serpentine channel 410 can be facilitated in many ways including by a pump, by a wicking structure, or the flow may be gravity-fed. It should be appreciated that each of the discrete regions 406 can also be configured with its own respective energy source 408 similar to the configuration depicted in FIG. 3B.

Figure 4B:
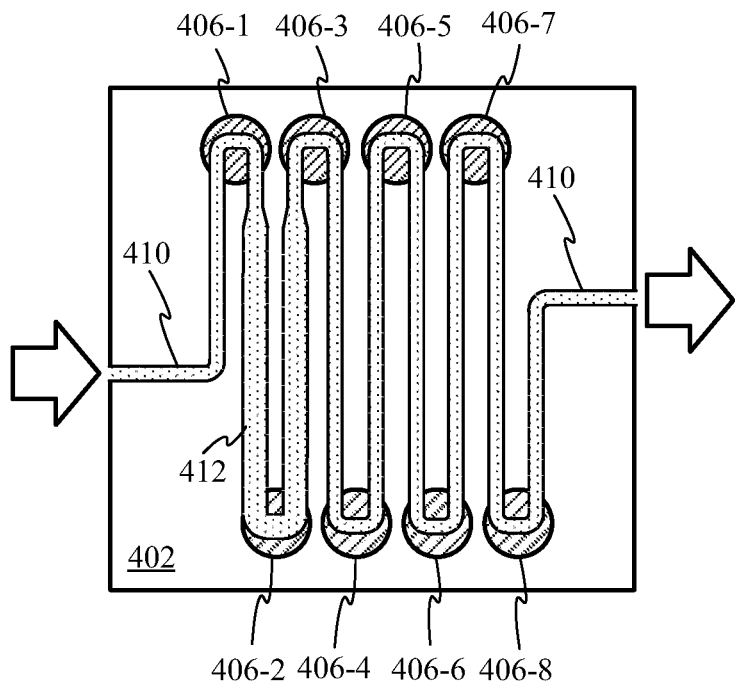
FIG. 4B shows a top view of the reaction vessel depicted in FIG. 4A with labels indicating each of discrete regions 406-1 through 406-8 of a light absorbing layer.

FIG. 4B shows a top view of the reaction vessel 400 with labels indicating each of discrete regions 406-1 through 406-8 of light absorbing layer 404. While FIG. 4B shows a direction of the flow of solution through serpentine channel 410 in a first direction, it should be appreciated that the flow of solution through serpentine channel 410 can move in a second direction opposite the first direction. In embodiments that include a pump mechanism, the flow of solution through serpentine channel 410 can be reversed at various points during a reaction to achieve a desired thermal heating profile for the solution disposed within channel 410. In some embodiments, single-strand DNA can be affixed to a binder positioned atop one or more of discrete regions 406-1 allowing biological materials within the solution being conducted along channel 410 to interact with the single-strand DNA at various temperatures generated by heat transferred to the solution at discrete regions 406. In some embodiments, a speed at which the solution passes through channel 410 can be varied by increasing the width and/or depth of the channel. For example, channel segment 412 is depicted having an increased width thereby reducing the speed and increasing the time the solution has to cool between discrete regions 406-1 and 406-2.

Figure 4C:
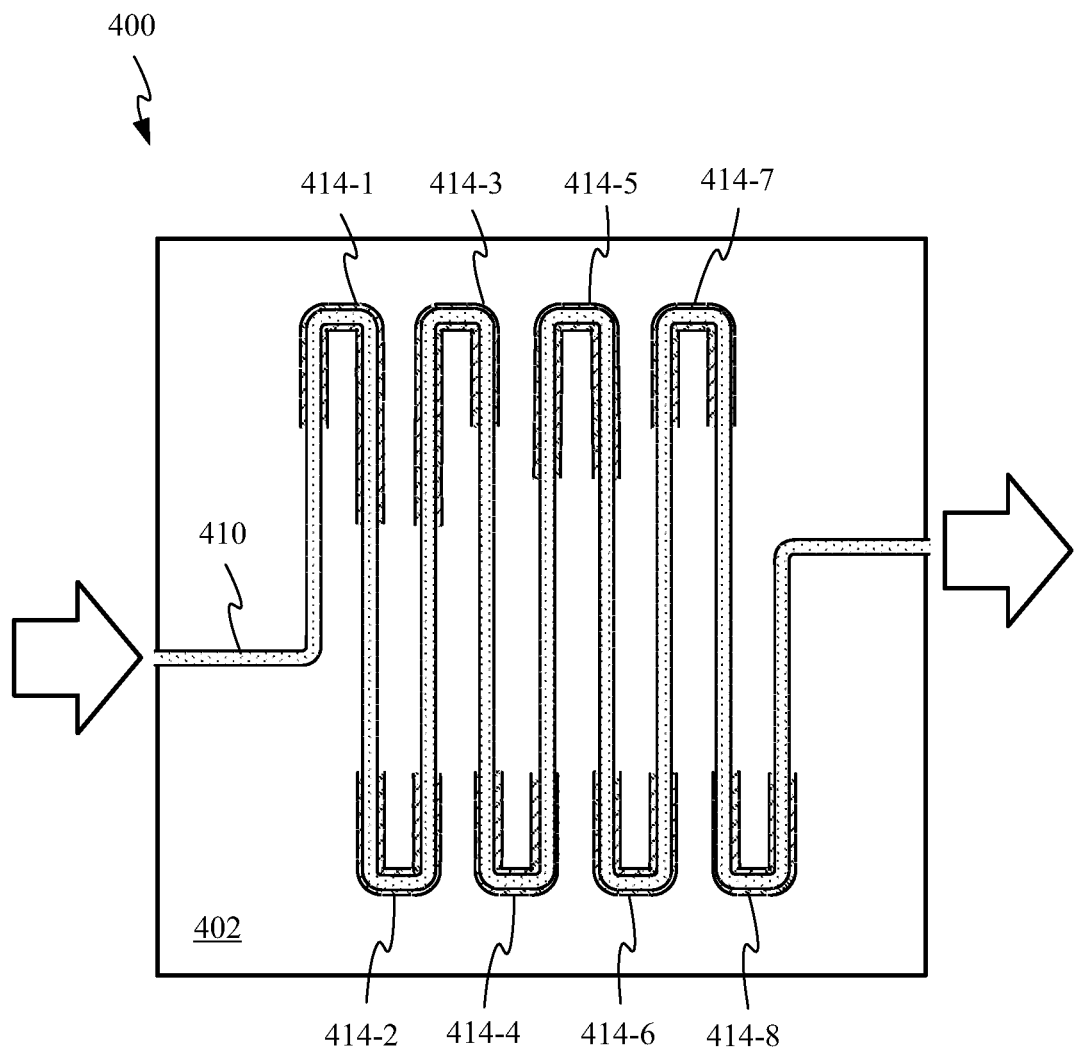
FIG. 4C shows another embodiment of a reaction vessel that includes a light absorbing layer with conformal discrete regions.

FIG. 4C shows another embodiment of reaction vessel 400 that includes a light absorbing layer with conformal discrete regions 414. Conformal discrete regions allow the energy from an energy source to be targeted at specific sections of channel 410. In this way, a length of segments of channel 410 between sequential discrete regions can be increased or decreased. For example, as depicted solution flowing between regions 414-1, 414-2 and 414-3 has less time to cool than when the solution is passing from region 414-3 to region 414-4. As previously described, each of discrete regions 414 could be supported by a shared energy source, by its own dedicated energy source, or by an energy source that illuminates a subset of discrete regions 414. It should be appreciated that while reaction chambers have been described in the context of a unitary chamber as shown in FIGS. 1A-3B, a divided reaction chamber as shown in FIG. 3C and as a channel in FIGS. 4A-4C that other reaction chamber configurations are possible. For example, a reaction chamber could take the form of an interior volume defined by a series of glue channels positioned between two flat plates or could simply consist of a location on a reaction vessel substrate. In general, the reaction chamber can be considered to be any fluidic path defined by the reaction vessel along which various reactions can be initiated. The fluidic path could be closed/sealed or open to the environment in certain embodiments.

Figure 5A:
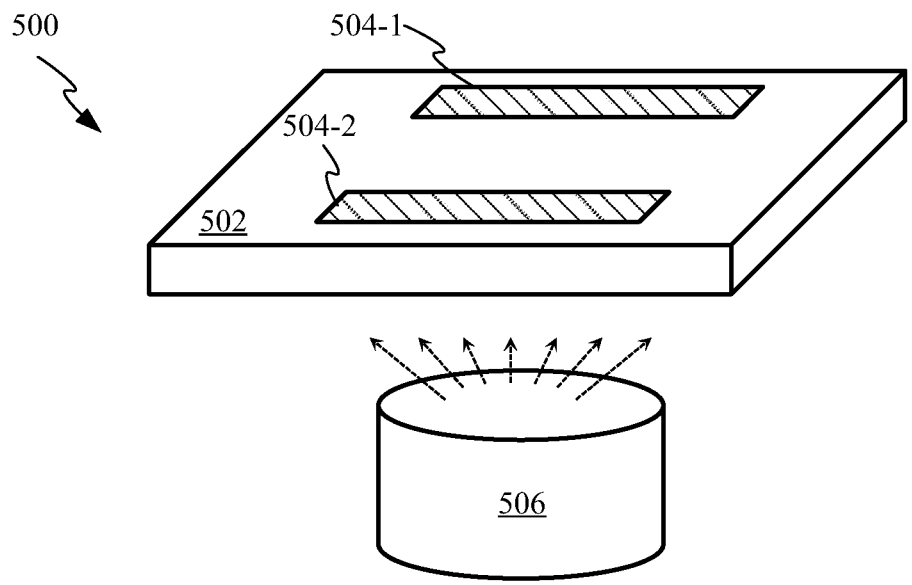
FIG. 5A shows a reaction vessel that includes a housing component having a light absorbing layer made up of two discrete regions.
Figure 5B:
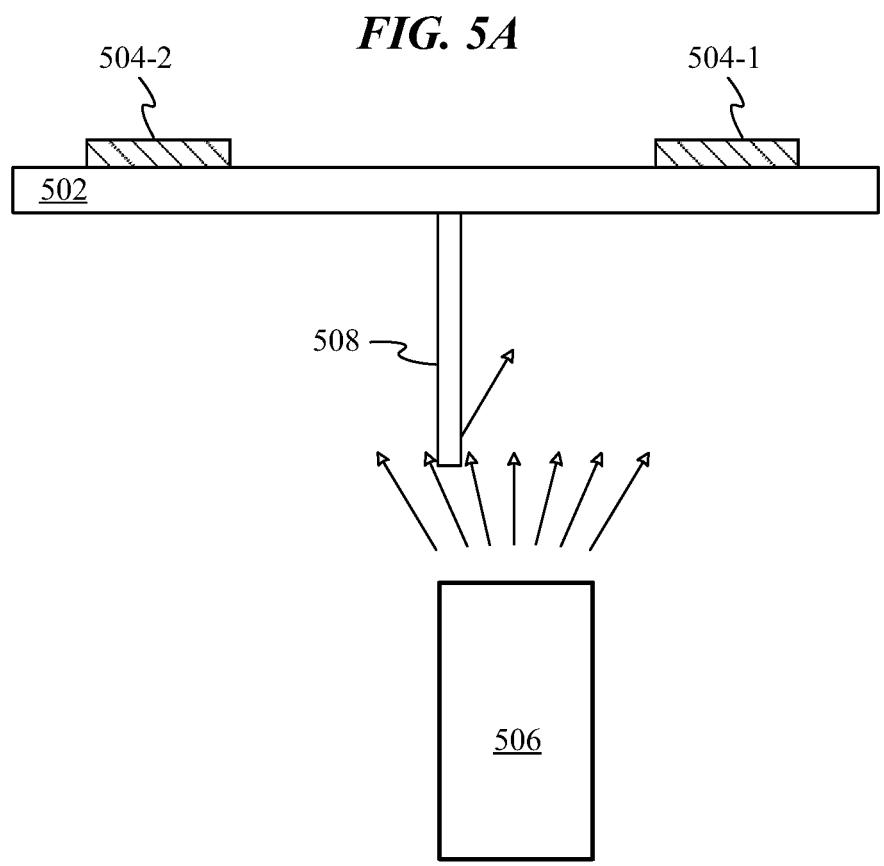
FIG. 5B shows how an energy source can be offset toward one of the two discrete regions such that one of the discrete regions receives more energy from the energy source than the other discrete region.

FIG. 5A shows a reaction vessel 500 that includes a housing component 502 having a light absorbing layer made up of two discrete regions 504-1 and 504-2. In some embodiments, discrete regions 504-1 and 504-2 can be driven by a single energy source 506, allowing each of discrete regions 504 to receive similar amounts of energy. FIG. 5B shows how energy source 506 can be offset toward discrete region 504-1 such that discrete region 504-1 receives more energy from energy source 506 than discrete region 504-2. This variance in energy between discrete regions 504-1 and 504-2 can be increased more by a reflector element 508 that further limits the amount of light arriving at discrete region 504-2 and is able to increase the light arriving at discrete region 504-1 by reflecting light emitted by energy source 506 toward discrete region 504-1 as depicted. In some embodiments, reflector element 508 can be tilted toward discrete region 504-1 to further increase the amount of light received from energy source 506.

Figure 5C:
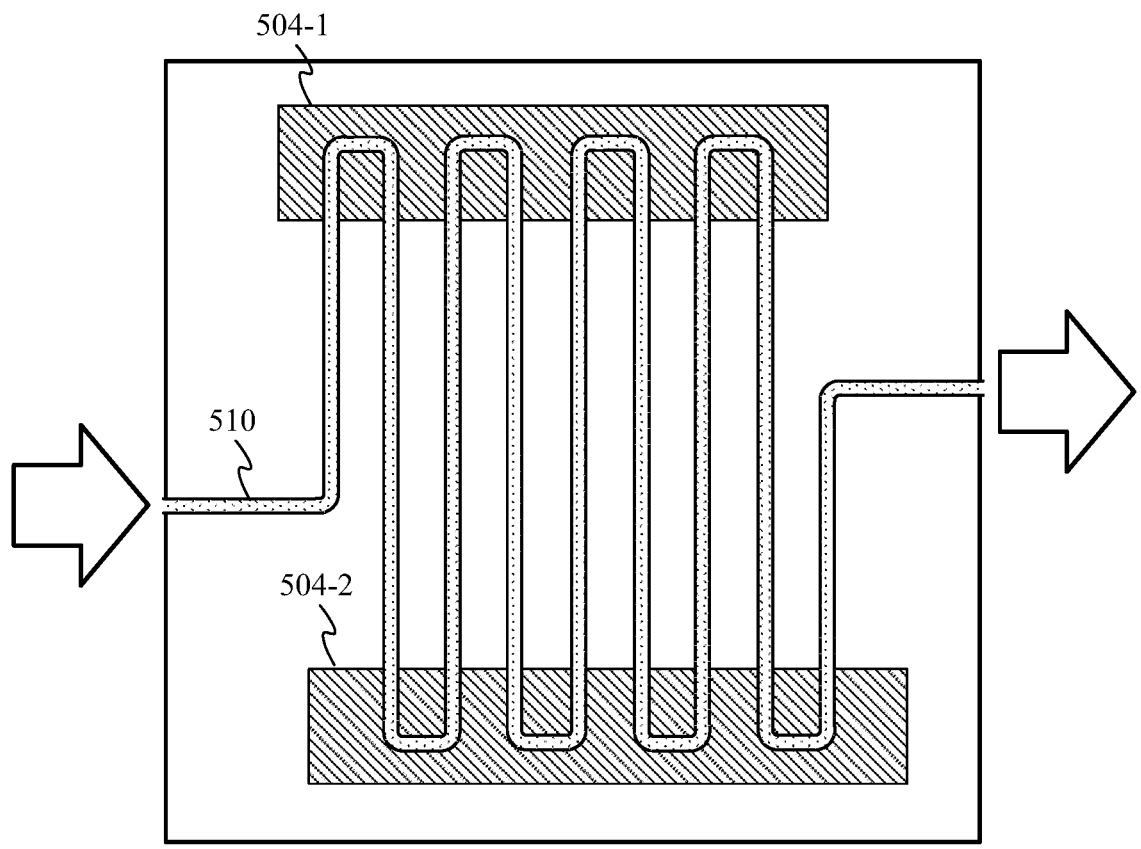
FIG. 5C shows a top view of the reaction vessel depicted in FIGS. 5A and 5B and how the reaction vessel can include a channel for guiding solution back and forth between the two discrete regions.

FIG. 5C shows a top view of reaction vessel 500 and how it can include a channel 510 for guiding solution back and forth between discrete regions 504-1 and 504-2. In some embodiments, discrete regions 504-1 and 504-2 can receive the same amount of energy. In this type of heating configuration, solution flowing through channel 510 passes from discrete region 504-1 at time $T_1$, through a portion of channel 510 disposed between discrete regions 504-1 and 504-2 at time $T_2$ and then through discrete region 504-2 at time $T_3$. In this way the solution carried by channel 510 cycles from a first temperature at time $T_1$ to a second temperature at time $T_2$ and then back to the first temperature at time $T_3$. In other embodiments, discrete regions 504-1 and 504-2 can receive different amounts of energy by offsetting an associated energy source toward one of discrete regions 504 by including dedicated energy sources for each of discrete regions 504 or by increasing or decreasing a thickness of a portion of the light absorbing layer making up one of discrete regions 504. By configuring the system to provide different amounts of energy at discrete regions 504-1 and 504-2, solution flowing through channel 510 is able to reach a larger variety of temperatures as it flows from one end of channel 510 to another.

Exemplary PCR Reactions

PCR amplifies a specific region of a DNA strand (the DNA target). Most PCR methods amplify DNA fragments of between 0.1 and 10 kilo basepairs (kb). The amount of amplified product is determined by the available substrates in the reaction, which become limiting as the reaction progresses. A basic PCR set-up requires several components and reagents, including: a DNA template that contains the DNA target region to amplify; a DNA polymerase, an enzyme that polymerizes new DNA strands; heat-resistant Taq polymerase is especially common, as it is more likely to remain intact during the high-temperature DNA denaturation process; two DNA primers that are complementary to the 3' ends of each of the sense and anti-sense strands of the DNA target; specific primers that are complementary to the DNA target region are selected beforehand, and are often custom-made in a laboratory or purchased from commercial biochemical suppliers; deoxynucleoside triphosphates, or dNTPs; a buffer solution providing a suitable chemical environment for optimum activity and stability of the DNA polymerase; bivalent cations, typically magnesium (Mg) or manganese (Mn) ions; Mg2+ is the most common, but Mn2+ can be used for PCR-mediated DNA mutagenesis, as a higher Mn2+ concentration increases the error rate during DNA synthesis; and monovalent cations, typically potassium (K) ions.

The reaction is commonly carried out in a volume of 10-200 μl in small reaction chambers (0.2-0.5 ml volumes) in a thermal cycler, which heats and cools the reaction tubes to achieve the temperatures required at each step of the reaction. Thin-walled reaction tubes permit favorable thermal conductivity to allow for rapid thermal equilibration.

Typically, PCR consists of a series of 20-40 repeated temperature changes, called cycles, with each cycle commonly consisting of two or three discrete temperature steps. The cycling is often preceded by a single temperature step at a very high temperature (>90° C. [194° F.]), followed by one hold at the end for final product extension or brief storage. The temperatures used and the length of time they are applied in each cycle depend on a variety of parameters, including the enzyme used for DNA synthesis, the concentration of bivalent ions and dNTPs in the reaction, and the melting temperature (Tm) of the primers. The individual steps common to most PCR methods are as follows:

(1) Initialization: This step is only required for DNA polymerases that require heat activation by hot-start PCR. It consists of heating the reaction chamber to a temperature of 94-96° C. (201-205° F.), or 98° C. (208° F.) if extremely thermostable polymerases are used, which is then held for 1-10 minutes.

(2) Denaturation: This step is the first regular cycling event and consists of heating the reaction chamber to 94-98° C. (201-208° F.) for 20-30 seconds. This causes DNA melting, or denaturation, of the double-stranded DNA template by breaking the hydrogen bonds between complementary bases, yielding two single-stranded DNA molecules.

(3) Annealing: In the next step, the reaction temperature is lowered to 50-65° C. (122-149° F.) for 20-40 seconds, allowing annealing of the primers to each of the single-stranded DNA templates. Two different primers are typically included in the reaction mixture: one for each of the two single-stranded complements containing the target region. The primers are single-stranded sequences themselves, but are much shorter than the length of the target region, complementing only very short sequences at the 3' end of each strand. The correct temperature for the annealing step is important, since this temperature strongly affects efficiency and specificity. This temperature must be low enough to allow for hybridization of the primer to the strand, but high enough for the hybridization to be specific, i.e., the primer should bind only to a perfectly complementary part of the strand, and nowhere else. If the temperature is too low, the primer may bind imperfectly. If it is too high, the primer may not bind at all. A typical annealing temperature is about 3-5° C. below the Tm of the primers used. Stable hydrogen bonds between complementary bases are formed only when the primer sequence very closely matches the template sequence. During this step, the polymerase binds to the primer-template hybrid and begins DNA formation.

(4) Extension/elongation: The temperature at this step depends on the DNA polymerase used; the optimum activity temperature for the thermostable DNA polymerase of Taq (*Thermus aquaticus*) polymerase is approximately 75-80° C. (167-176° F.), though a temperature of 72° C. (162° F.) is commonly used with this enzyme. In this step, the DNA polymerase synthesizes a new DNA strand complementary to the DNA template strand by adding free dNTPs from the reaction mixture that are complementary to the template in the 5'-to-3' direction, condensing the 5'-phosphate group of the dNTPs with the 3'-hydroxy group at the end of the nascent (elongating) DNA strand. The precise time required for elongation depends both on the DNA polymerase used and on the length of the DNA target region to amplify. As a rule of thumb, at their optimal temperature, most DNA polymerases polymerize a thousand bases per minute. Under optimal conditions (i.e., if there are no limitations due to limiting substrates or reagents), at each extension/elongation step, the number of DNA target sequences is doubled. With each successive cycle, the original template strands plus all newly generated strands become template strands for the next round of elongation, leading to exponential (geometric) amplification of the specific DNA target region.

The processes of denaturation, annealing and elongation constitute a single cycle. Multiple cycles are required to amplify the DNA target to millions of copies. The formula used to calculate the number of DNA copies formed after a given number of cycles is 2n, where n is the number of cycles.

(5) Final elongation: This single step is optional, but is performed at a temperature of 70-74° C. (158-165° F.) (the temperature range required for optimal activity of most polymerases used in PCR) for 5-15 minutes after the last PCR cycle to ensure that any remaining single-stranded DNA is fully elongated.

(6) Final hold: The final step cools the reaction chamber to 4-15° C. (39-59° F.) for an indefinite time, and may be employed for short-term storage of the PCR products.

To check whether the PCR successfully generated the anticipated DNA target region (also sometimes referred to as the amplimer or amplicon), agarose gel electrophoresis may be employed for size separation of the PCR products. The size(s) of PCR products is determined by comparison with a DNA ladder, a molecular weight marker which contains DNA fragments of known size run on the gel alongside the PCR products. As with other chemical reactions, the reaction rate and efficiency of PCR are affected by limiting factors. Thus, the entire PCR process can further be divided into three stages based on reaction progress:

(1) Exponential amplification: At every cycle, the amount of product is doubled (assuming 100% reaction efficiency). After 30 cycles, a single copy of DNA can be increased up to one billion copies. The reaction is very sensitive: only minute quantities of DNA must be present.

(2) Leveling off stage: The reaction slows as the DNA polymerase loses activity and as consumption of reagents such as dNTPs and primers causes them to become limiting.

(3) Plateau: No more product accumulates due to exhaustion of reagents and enzyme.

Upon loading and sealing, the system may generate an amplified product through thermal cycling. Thermal cycling may comprise one or more cycles of incubating a reaction mixture at a denaturation temperature for a denaturation time period followed by incubating the mixture at an annealing temperature for an annealing time period further followed by incubating the mixture at an elongation temperature for an elongation time period. A system may heat the wells of the reaction well by using one or more light sources as previously described. Focused light by lens between light source and reaction well may be used also. The embedded lens may be used to focus emission from the fluorescent dye integrated in the reaction vessel/wells. For the cooling of the sample and reagents, the one or more light sources may be turned off for a cooling time period. In some cases, a fluid circulation channel may be used as previously described for the cooling of the reagents and samples in the wells of the reaction well.

Amplification of a sample may be performed by using the systems described previously to perform one or more thermal cycles comprising a denaturation cycle, an annealing cycle and an elongation cycle. The time in which an amplification reaction may yield a detectable result in the form of an amplified product may vary depending on the target nucleic acid, the sample, the reagents used and the protocol for PCR. In some cases, an amplification process may be performed in less than 1 minute. In some cases, an amplification process may be performed in about 1 minute to about 40 minutes. In some cases, an amplification process may be performed in at least about 1 minute. In some cases, an amplification process may be performed in at most about 40 minutes. In some cases, an amplification process may be performed in about 1 minute to about 5 minutes, about 1 minute to about 10 minutes, about 1 minute to about 15 minutes, about 1 minute to about 20 minutes, about 1 minute to about 25 minutes, about 1 minute to about 30 minutes, about 1 minute to about 35 minutes, about 1 minute to about 40 minutes, about 5 minutes to about 10 minutes, about 5 minutes to about 15 minutes, about 5 minutes to about 20 minutes, about 5 minutes to about 25 minutes, about 5 minutes to about 30 minutes, about 5 minutes to about 35 minutes, about 5 minutes to about 40 minutes, about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes. In some cases, an amplification process may be performed in about 1 minute, about 5 minutes, about 10 minutes, about 15 minutes, about 20 minutes, about 25 minutes, about 30 minutes, about 35 minutes, or about 40 minutes.

In some cases, amplification of a sample may be performed by repeating the thermal cycle 5 to 40 times. In some cases, the thermal cycle may be repeated at least 5 times. In some cases, the thermal cycle may be repeated at most 60 times. In some cases, the thermal cycle may be repeated 5 times, 10 times, 15 times, 20 times, 25 times, 30 times, 35 times 40 times, 45 times, 50 times, 55 times or 60 times.

A thermal cycle may be completed in a thermal cycling time period. In some cases, a thermal cycling time period may range from 2 seconds to 60 seconds per cycle. In some cases, a thermal cycle may be completed in about 2 seconds to about 60 seconds. In some cases, a thermal cycle may be completed in at least about 2 seconds. In some cases, a thermal cycle may be completed in at most about 60 seconds. In some cases, a thermal cycle may be completed in about 2 seconds to about 5 seconds, about 2 seconds to about 10 seconds, about 2 seconds to about 20 seconds, about 2 seconds to about 40 seconds, about 2 seconds to about 60 seconds, about 5 seconds to about 10 seconds, about 5 seconds to about 20 seconds, about 5 seconds to about 40 seconds, about 5 seconds to about 60 seconds, about 10 seconds to about 20 seconds, about 10 seconds to about 40 seconds, about 10 seconds to about 60 seconds, about 20 seconds to about 40 seconds, about 20 seconds to about 60 seconds, or about 40 seconds to about 60 seconds. In some cases, a thermal cycle may be completed in about 2 seconds, about 5 seconds, about 10 seconds, about 20 seconds, about 40 seconds, or about 60 seconds.

The temperature and time period of the denaturation cycle may be dependent on the properties sample to be identified, the reagents and the amplification protocol being used. A denaturation cycle may be performed at temperatures ranging from about 80° C. to about 110° C. A denaturation cycle may be performed at a temperature of at least about 80° C. A denaturation cycle may be performed at a temperature of at most about 110° C. A denaturation cycle may be performed at a temperature of about 80° C. to about 85° C., about 80° C. to about 90° C., about 80° C. to about 95° C., about 80° C. to about 100° C., about 80° C. to about 105° C., about 80° C. to about 110° C., about 85° C. to about 90° C., about 85° C. to about 95° C., about 85° C. to about 100° C., about 85° C. to about 105° C., about 85° C. to about 110° C., about 90° C. to about 95° C., about 90° C. to about 100° C., about 90° C. to about 105° C., about 90° C. to about 110°

C., about 95° C. to about 100° C., about 95° C. to about 105° C., about 95° C. to about 110° C., about 100° C. to about 105° C., about 100° C. to about 110° C., or about 105° C. to about 110° C. A denaturation cycle may be performed at a temperature of about 80° C., about 85° C., about 90° C., about 95° C., about 100° C., about 105° C., or about 110° C.

In some cases, the time period of a denaturation cycle may be less than about 1 second. In some cases, the time period of a denaturation cycle may be at most about 100 seconds. In some cases, the time period of a denaturation cycle may be about 0 second to 1 second, about 1 second to about 5 seconds, about 1 second to about 10 seconds, about 1 second to about 20 seconds, about 1 second to about 40 seconds, about 1 second to about 60 seconds, about 1 second to about 100 seconds, about 5 seconds to about 10 seconds, about 5 seconds to about 20 seconds, about 5 seconds to about 40 seconds, about 5 seconds to about 60 seconds, about 5 seconds to about 100 seconds, about 10 seconds to about 20 seconds, about 10 seconds to about 40 seconds, about 10 seconds to about 60 seconds, about 10 seconds to about 100 seconds, about 20 seconds to about 40 seconds, about 20 seconds to about 60 seconds, about 20 seconds to about 100 seconds, about 40 seconds to about 60 seconds, about 40 seconds to about 100 seconds, or about 60 seconds to about 100 seconds. In some cases, the time period of a denaturation cycle may be less than about 1 second, about 5 seconds, about 10 seconds, about 20 seconds, about 40 seconds, about 60 seconds, or about 100 seconds.

The temperature and time period of the annealing and elongation cycles may be dependent on the properties sample to be identified, the reagents and the amplification protocol being used. An annealing and/or elongation cycle may be performed at a temperature of about 40° C. to about 70° C. An annealing and/or elongation cycle may be performed at a temperature of at least about 40° C. An annealing and/or elongation cycle may be performed at a temperature of at most about 70° C. An annealing and/or elongation cycle may be performed at a temperature of about 40° C. to about 45° C., about 40° C. to about 50° C., about 40° C. to about 55° C., about 40° C. to about 60° C., about 40° C. to about 65° C., about 40° C. to about 70° C., about 45° C. to about 50° C., about 45° C. to about 55° C., about 45° C. to about 60° C., about 45° C. to about 65° C., about 45° C. to about 70° C., about 50° C. to about 55° C., about 50° C. to about 60° C., about 50° C. to about 65° C., about 50° C. to about 70° C., about 55° C. to about 60° C., about 55° C. to about 65° C., about 55° C. to about 70° C., about 60° C. to about 65° C., about 60° C. to about 70° C., or about 65° C. to about 70° C. An annealing and/or elongation cycle may be performed at a temperature of about 40° C., about 45° C., about 50° C., about 55° C., about 60° C., about 65° C., or about 70° C.

In some cases, the time period of an annealing and/or elongation cycle may be less than about 1 second. In some cases, the time period of an annealing and/or elongation cycle may be at most about 60 seconds. In some cases, the time period of an annealing and/or elongation cycle may be about 0 seconds to 1 seconds, about 1 second to about 5 seconds, about 1 second to about 10 seconds, about 1 second to about 20 seconds, about 1 second to about 40 seconds, about 1 second to about 60 seconds, about 5 seconds to about 10 seconds, about 5 seconds to about 20 seconds, about 5 seconds to about 40 seconds, about 5 seconds to about 60 seconds, about 10 seconds to about 20 seconds, about 10 seconds to about 40 seconds, about 10 seconds to about 60 seconds, about 20 seconds to about 40 seconds, about 20 seconds to about 60 seconds, or about 40 seconds to about 60 seconds. In some cases, the time period of an annealing and/or elongation cycle may be less than about 1 second, about 5 seconds, about 10 seconds, about 20 seconds, about 40 seconds, or about 60 seconds.

In some cases, a cooling cycle may be performed between the denaturation cycle and annealing and/or elongation cycles. In some cases, a cooling cycle may be performed for about 1 second to about 60 seconds. In some cases, a cooling cycle may be performed for at least about 1 second. In some cases, a cooling cycle may be performed for at most about 60 seconds. In some cases, a cooling cycle may be performed for about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some cases, a cooling cycle may be performed for about 1 second, about 5 seconds, about 10 seconds, about 20 seconds, about 30 seconds, about 40 seconds, about 50 seconds, or about 60 seconds.

Detection of the amplified product may be performed at various stages of the amplification process. In some cases, the detection of an amplified product may be performed at the end of the amplification process. In some cases, the detection of the amplified product may be performed during a thermal cycle. Alternatively, in some cases, detection may be performed at the end of each thermal cycle. In addition to the detection methods described herein, detection of an amplified product may be performed using gel electrophoresis, capillary electrophoresis, sequencing, short tandem repeat analysis and other known methods.

Figure 6A:
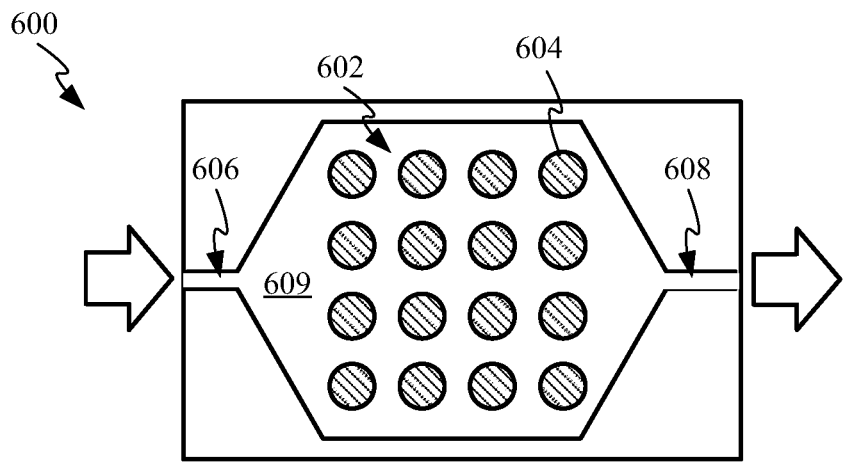
FIGS. 6A-6C show examples of hybridization and solid-phase PCR operations in a reaction vessel having a light absorbing layer with multiple discrete regions.
Figure 6B:
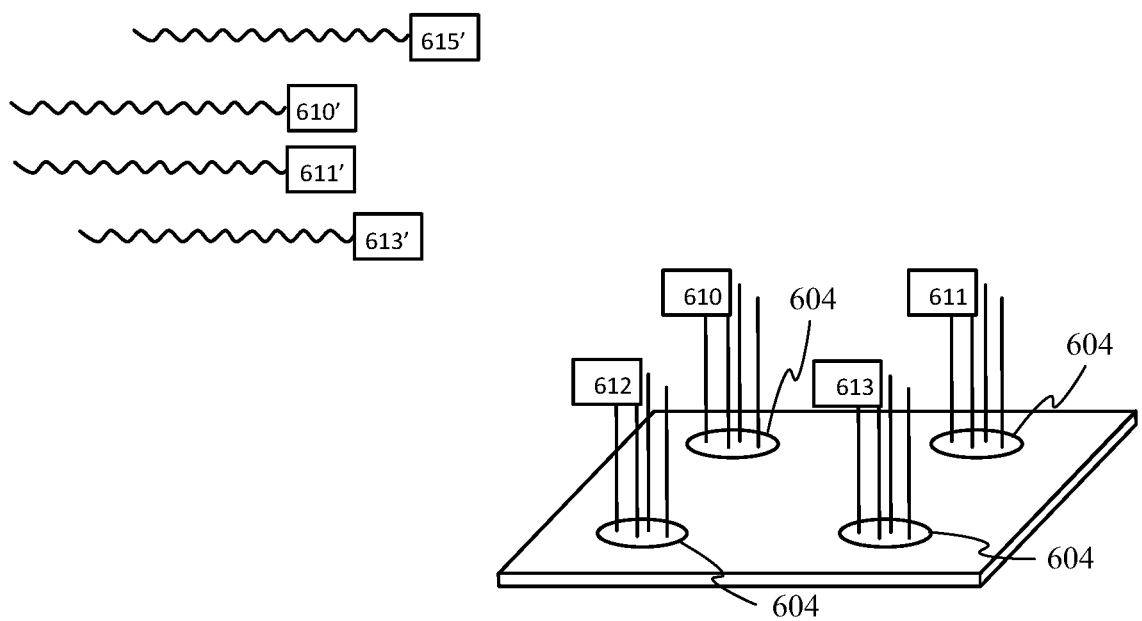
Figure 6C:
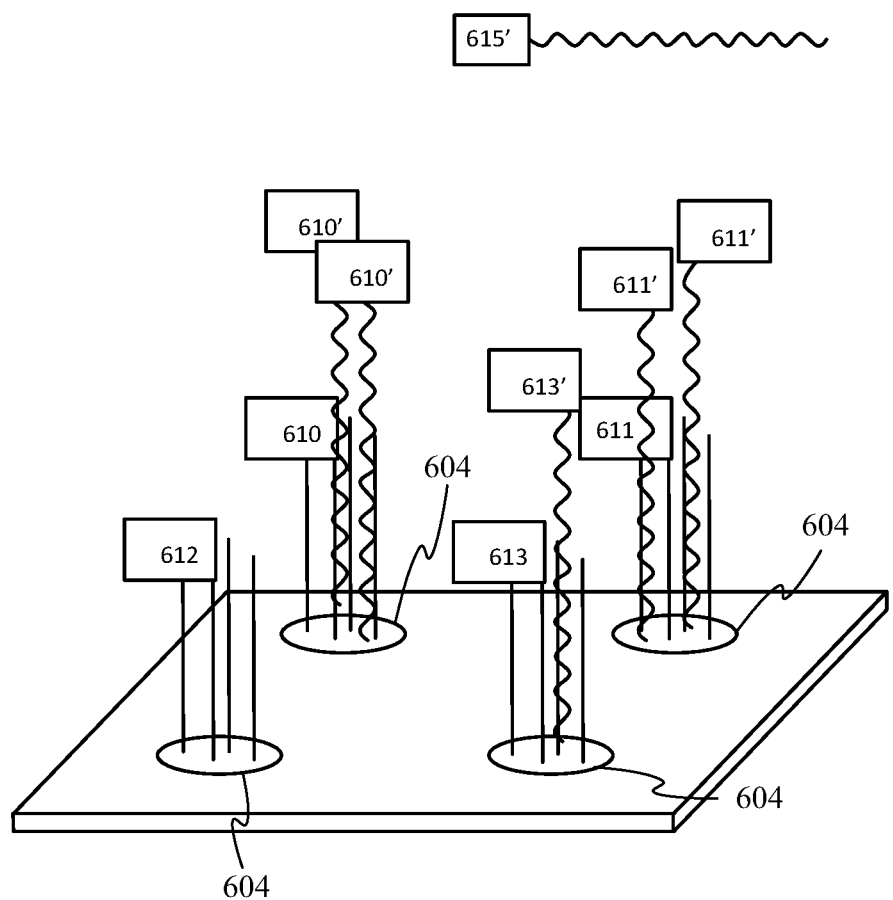

FIGS. 6A-6C show examples of hybridization and solid-phase PCR operations in a reaction vessel 600 having a light absorbing layer with multiple discrete regions. FIG. 6A shows a top view of a reaction vessel 600 having a light absorbing layer 602 that includes an array of discrete regions 604 arranged in a grid pattern. Reaction vessel 600 includes inlet port 606 and outlet port 608 that are configured to allow solution to flow into and out of reaction chamber 609.

In some embodiments, one or more of the discrete regions of a reaction vessel may be bound to one or more nucleotide sequences. For example, referencing the example illustrated in FIG. 6B, each discrete region 604 possesses unique probes or primer sequences 610, 611, 612, and 613 that are bound, for example, by weak covalent interactions (e.g., Au-thiol). As illustrated, a solution including the target molecules 610', 611' and 613' may be flowed over the discrete regions 604. These probes or primer sequences may be complementary to the target molecules 610', 611' and 613'. In the illustrated example, the solution also includes target molecules 615,' which are not complementary to any of the bound probes or primer sequences. Target molecules 610', 611', 613' and 615' can be fluorescently labeled for detection purposes.

In some embodiments, as the solution is caused to flow across the discrete regions 604, target molecules in the solution that are complementary to sequences bound to the discrete regions 604 may hybridize with those sequences. FIG. 6C shows how target molecules only hybridize with their complementary sequence bound on the surface. For example, as illustrated in FIG. 6C, target molecules 610', 611' and 613' hybridize with their respective complementary sequences 610, 611 and 613 that are themselves bound to their respective discrete regions 604. Thus, target molecules 610', 611' and 613' become bound to the discrete regions 604 via their respective complementary sequences. Target molecules that do not have complementary sequences (e.g., the target molecule 615') may not hybridize, and may therefore be left unbound in solution. These unbound molecules may leave the reaction vessel when the solution is caused to flow out of the reaction vessel (e.g., referencing FIG. 6A, via the outlet port 608). Similarly, sequences bound to discrete regions 604 that do not have complementary target molecules in solution do not hybridize. For example, as illustrated in FIG. 6C, the sequences 612 remain un-hybridized. As mentioned previously, in some embodiments, the target molecules may be labeled for detection purposes. For example, the target molecules may be fluorescently labeled. Once a solution has been flowed into and out of the reaction vessel (after sufficient time has been allowed for hybridization), a detection mechanism may be used to detect the presence of target molecules that have been labeled. For example, the detection mechanism may include a light source designed to excite fluorescent labels bound to target molecules and a camera device for detecting the presence of the fluorescent labels. In this example, the florescent light source may be shined on the reaction vessel, and the resulting fluorescence intensity at each discrete region can be used to detect the presence or absence of a given target molecule. For example, referencing FIG. 6C, shining a suitable light source at the discrete regions 604 after the solution has been allowed to leave the reaction vessel (along with unbound target molecules such as the target molecule 615') may cause the fluorescent labels of all bound target molecules to fluoresce. A camera may detect that areas corresponding to discrete regions 604 associated with the sequences 610, 611 and 613 fluoresce above a threshold intensity, while the area corresponding to the discrete region 604 associated with the sequence 612 does not fluoresce above the threshold intensity (because it lacks target molecules with fluorescent labels).

Following hybridization, solid phase PCR can be performed to create a population of discrete amplicons, which can then be detected via a molecule that binds to DNA, and can be used to detect the presence of said molecule (e.g. through fluorescence and/or electrochemical signal). Solid-phase PCR uses surface-bound primers on the discrete regions instead of freely-diffusing primers to amplify DNA. This may limit the nucleic acids amplification to two-dimensional surfaces on the discrete regions and therefore allows for easy parallelization and high multiplexing of DNA amplification and detection in a single reaction vessel system. Alternatively, amplicons can be sequenced to identify the presence of said molecule.

Figure 6D:
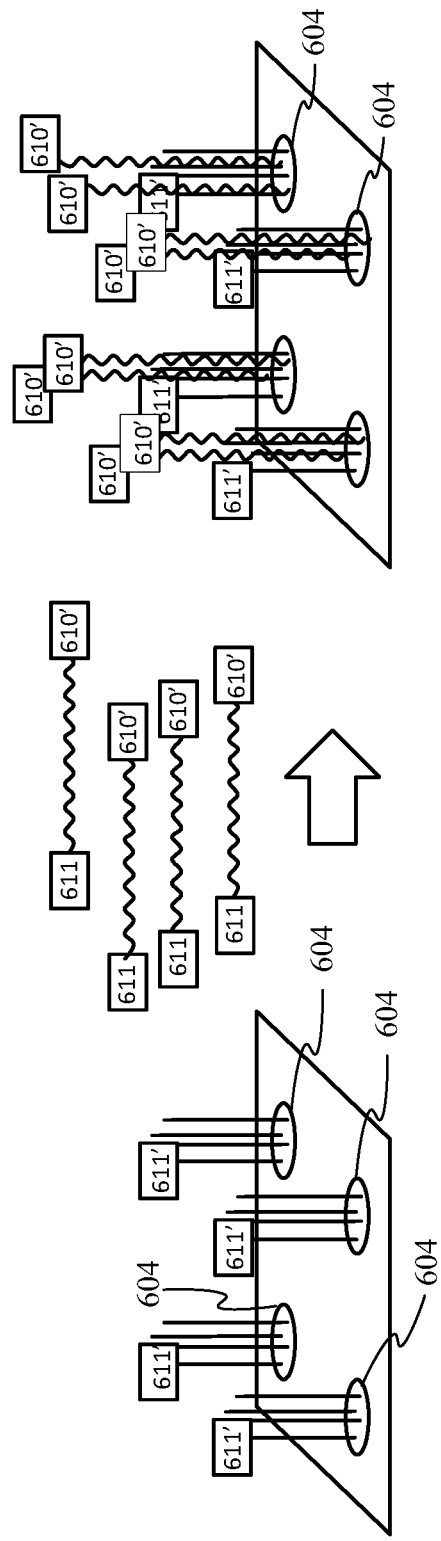
FIG. 6D shows another example of solid phase PCR in which single strands of DNA are bonded to single strand DNA attached to discrete regions of a light absorbing layer.

FIG. 6D shows another example where each discrete region 604 possesses a unique primer sequence 611' bound by weak covalent interactions (e.g., Au-thiol). As illustrated, a solution including target molecules 611, 610' may be caused to flow over the discrete regions 604. We target molecules 611, 610' may include an adaptor portion 611 that is complementary to the unique primer sequence 611' and a second portion (e.g., a portion of a DNA molecule or an RNA molecule). For example, the adapter portion 611 may be an adapter (configured to bind to the unique primer sequence 611') that is ligated to the second portion 610', which may be a DNA molecule. In this example, the adapter portion 611 may be foreign to the target DNA molecule. Following hybridization, solid phase PCR can be performed to create a population of discrete amplicons, which can then be sequenced to identify the presence of said molecule.

Figure 7A:
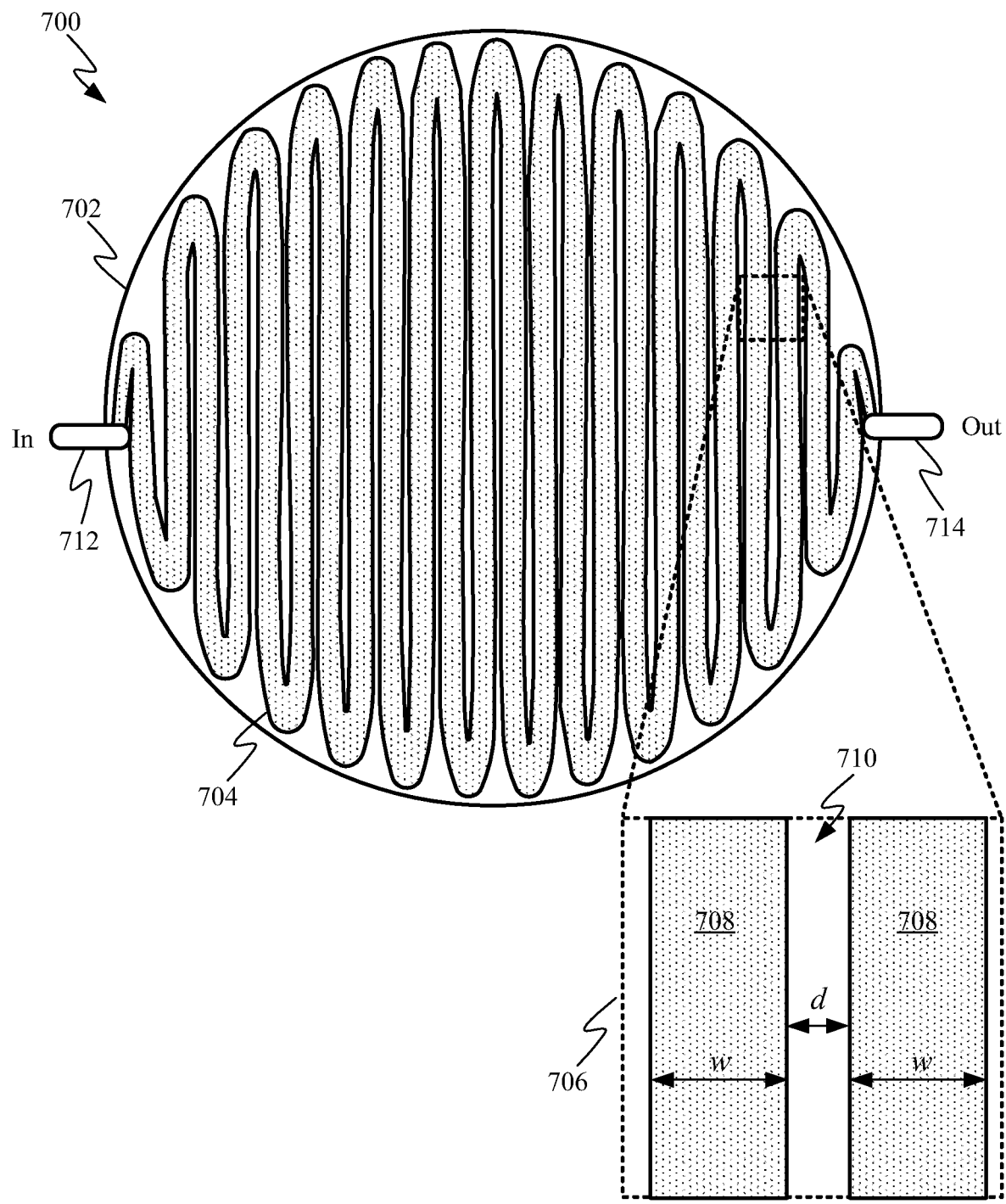
FIG. 7A shows a top view of a portion of a reaction vessel having a reaction vessel wall formed from optically transparent material.

FIG. 7A shows a top view of a portion of a reaction vessel 700. In particular, a reaction vessel wall 702 formed from optically transparent material is depicted. An interior-facing surface of reaction vessel wall 702 is plated with light absorbing layer 704, which has a serpentine or meandering pattern that covers a majority of the interior-facing surface of reaction vessel wall 702. Examples of reaction vessel walls are depicted in FIGS. 1A-1B by housing components 102 and 152. The reaction vessel wall 702 corresponds to that portion of housing components 102 and 152 that form reaction chamber 104. Because light absorbing layer 704 is positioned upon the interior-facing surface of reaction vessel wall 702, any photonic energy converted into heat energy by light absorbing layer 704 can be conducted directly into solution positioned within a reaction chamber defined at least in part by reaction vessel wall 702. Light absorbing layer 704 is formed from electrically conductive material such as elemental gold, chromium, titanium, germanium, nickel, platinum, graphene and silver or a gold alloy such as, e.g., gold-germanium, gold-chromium, gold-titanium, gold-chromium-germanium and gold-titanium-germanium, combinations thereof, or the like.

As depicted in FIG. 7A, the pattern of light absorbing layer 704 can be arranged so as to form an electrically conductive pathway that travels across the majority of an area provided by the interior-facing surface of reaction vessel wall 702. The large area occupied by light absorbing layer 704 allows light absorbing layer 704 to absorb a significant amount, for example, a majority of the photonic energy directed at reaction vessel wall 702. Close up view 706 shows how adjacent segments 708 of light absorbing layer 704 can be at least twice as wide (w) as a gap (d) 710 separating the adjacent segments. In some embodiments, adjacent segments of light absorbing layer 704 can be up to ten times as wide as gap 710. By including only a narrow gap 710 between adjacent segments as depicted, light absorbing layer 704 can have a density sufficient to efficiently heat material within reaction vessel 700.

In some embodiments, light absorbing layer 704 can cover between 5% and 95% of the surface area of reaction vessel wall 702. When larger amounts of heat transfer are required, light absorbing layer 704 can cover between 50% and 95% of the surface area reaction vessel wall 702. In some embodiments, gap 710 can be less than or equal to 800 nm. This small gap size has the benefit of filtering out some infrared wavelengths of light from entering reaction vessel 700 while simultaneously allowing light having a shorter wavelength, for example, visible or ultraviolet wavelengths, to pass through the small gaps between the adjacent segments. An additional benefit of this configuration is that longer wavelengths of light (i.e. wavelengths longer than 800 nm) that are associated with light waves imparted by a photonic energy source are in most cases too large to pass through the gap and therefore unable to bypass the light absorbing layer. In this way, the small gaps between adjacent segments do not materially degrade the conversion of photonic energy into heat energy.

FIG. 7A also shows how electricity can be routed through the electrically conductive pathway defined by light absorbing layer 704. In particular, a first electrical pad 712 is depicted at a first side of reaction vessel 700 and electrically couples a first side of light absorbing layer 704 to an electrical input (In), e.g., coupled to a first terminal of an electrical energy source such as a DC source, an AC source, a battery, etc. A second electrical pad 714 is depicted at a second side of reaction vessel 700 and electrically couples a second side of light absorbing layer 704 to an electrical output (Out), e.g., coupled a second terminal of the electrical energy source. By measuring a voltage change (e.g., a voltage drop) between the first and second electrical pads, the electrical resistance of light absorbing layer 704 can be determined. As described herein, this electrical resistance can be correlated with temperature and may therefore be used as a proxy to determine temperature in a reaction vessel or chamber.

Since the material making up light absorbing layer 704 is an electrically conductive material, electrical resistivity will generally increase with increasing temperatures. For example, an electrical resistivity of copper and gold generally increases linearly with respect to increases in temperature while other electrical conductors have non-linear responses to increases in temperature. These predictable changes in electrical resistance due to temperature allows for accurate measurements of temperature to be made within reaction vessel 700 without the need for a separate temperature sensor. For example, a resistance of the light absorbing layer 704 at a given time can be determined by measuring a voltage change when electricity is passed through the light absorbing layer 704. In this example, an associated processor may determine a temperature corresponding to the determined resistance (e.g., by accessing a lookup table or based on a function that calculates temperature based on resistance). This method of determining temperature allows light absorbing layer 704 to act to both efficiently add heat to reaction vessel 700 and to measure how quickly that heat increases a temperature of the interior of reaction vessel 700. It should be noted that the changes in electrical resistance of the light absorbing layer due to temperature change are caused by small changes in the lattice structure of the metal resulting from the changes in temperature. In some embodiments, changes of the electrical resistivity of the light absorbing layer over time can also be used to measure a structural integrity of the light absorbing layer. Periodic calibration tests can be performed to identify these changes over time.

Figure 7B:
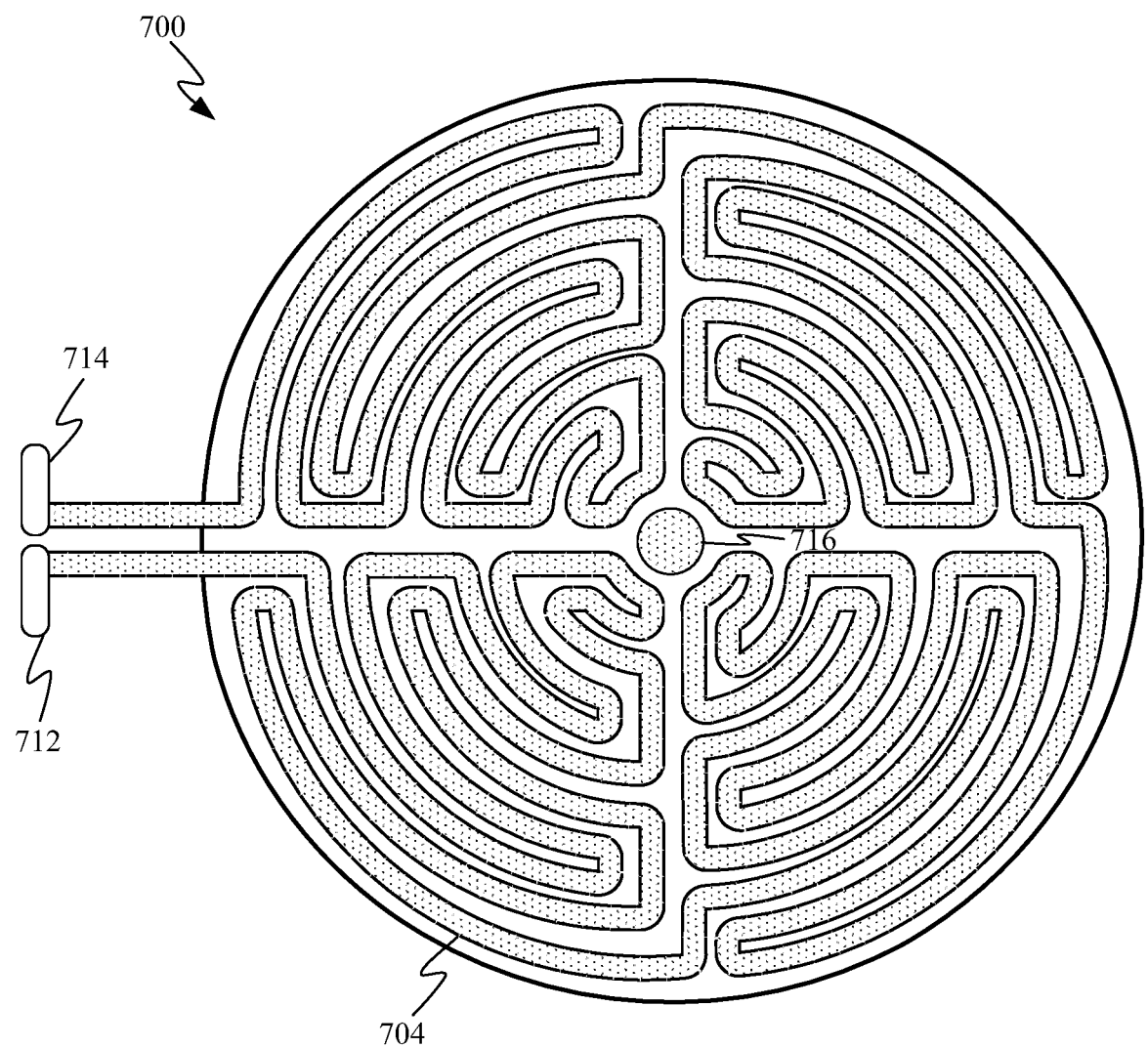
FIG. 7B shows a second configuration of a light absorbing layer.

FIG. 7B shows how light absorbing layer 704 can be arranged in a different pattern than the one depicted in FIG. 7A. In particular, the pattern illustrated in FIG. 7B forms an electrically conductive pathway that sequentially covers each of four quadrants of reaction vessel 700. The multiple turns of the electrically conductive path help increase an electrical resistance of the electrically conductive path, thereby helping make changes in the resistance more noticeable to a processor monitoring the voltage different between electrical pads 712 and 714. This configuration also shows how the electrically conductive pathway formed by light absorbing layer 704 can enter and exit reaction vessel 700 in substantially the same area. The entrance point through which the electrically conductive pathway enters and exits reaction vessel 700 can coincide with a liquid entry channel or can be used solely for the entry and exit of the electrically conductive pathway formed by light absorbing layer 704. FIG. 7B also shows how a central portion 716 of light absorbing layer 704 can be entirely disassociated from the electrically conductive pathway and function primarily as a light absorbing layer to transfer heat converted from photonic energy into solution within reaction vessel 700.

Figure 7C:
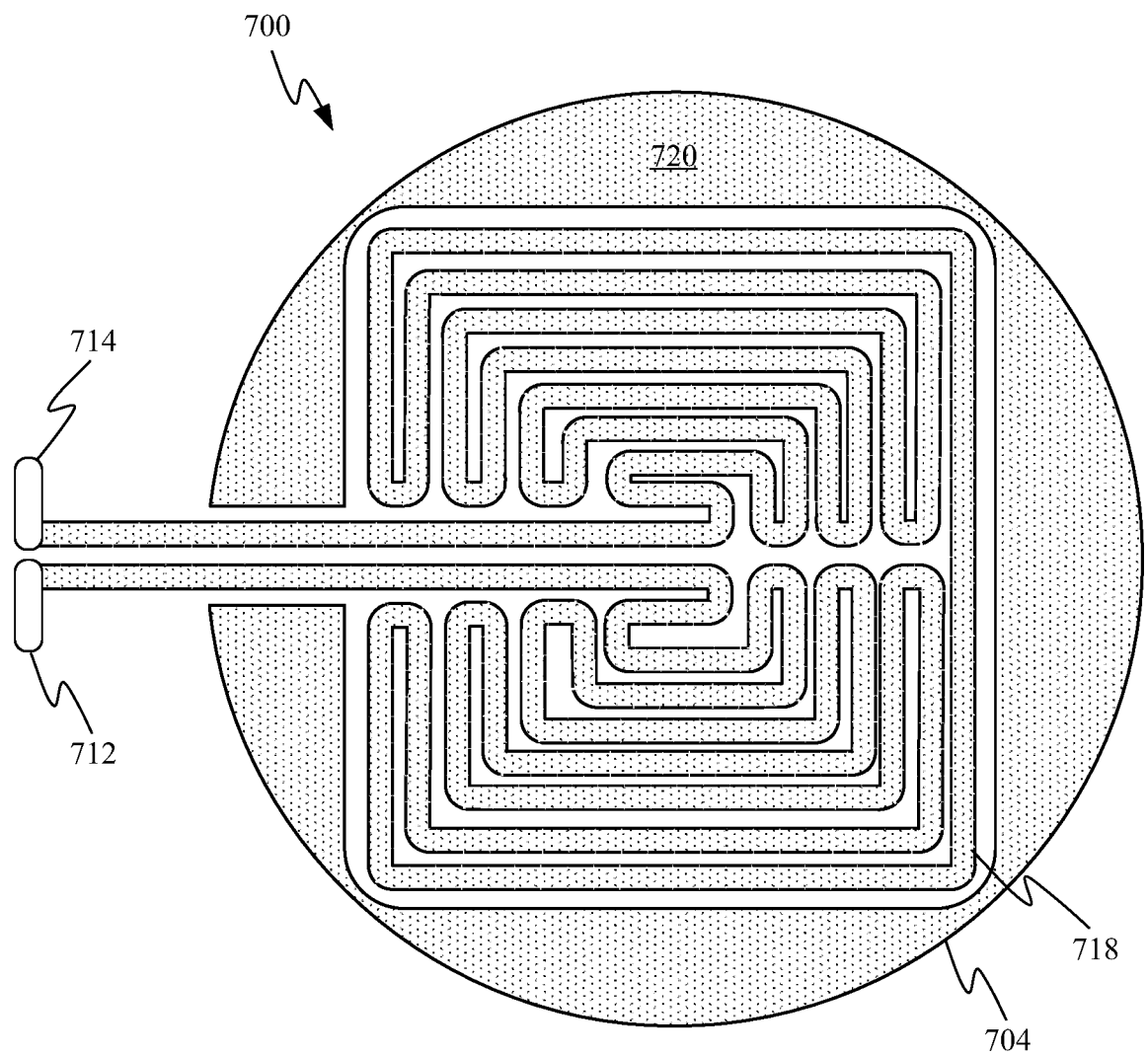
FIG. 7C shows a third configuration of a light absorbing layer in which a central region of light absorbing layer defines an electrically conductive pathway and a peripheral region of the light absorbing layer is used only for heat generation and transfer.

FIG. 7C shows a third configuration of light absorbing layer 704 in which a central region 718 of light absorbing layer 704 defines an electrically conductive pathway coupled to electrical pads 712 and 714 and a peripheral region 720 of light absorbing layer 704 is not electrically connected to the central region and is used only for heat generation and transfer. This configuration results in temperature measurements made using the electrically conductive pathway being biased toward the central region of reaction vessel 700. This may be helpful where reactions are more likely or expected to occur in particular regions of a reaction vessel, and a peripheral region of the reaction vessel is expected to be at a slightly different temperature than a central region. For example, this might be the case for a reaction vessel in which the peripheral region is shallower than the central region, as in the example reaction vessels 100 and 150 of FIGS. 1A-1B, which have a curved or graded reaction chamber 104. As another example, a concentration of bound molecules (e.g., in solid-phase PCR, as depicted, for example in FIGS. 6A-6D) may be higher in particular regions of a reaction chamber (e.g., referencing FIGS. 6A-6D, the discrete regions 604 of reaction chamber 609 of reaction vessel 600).

Figure 7D:
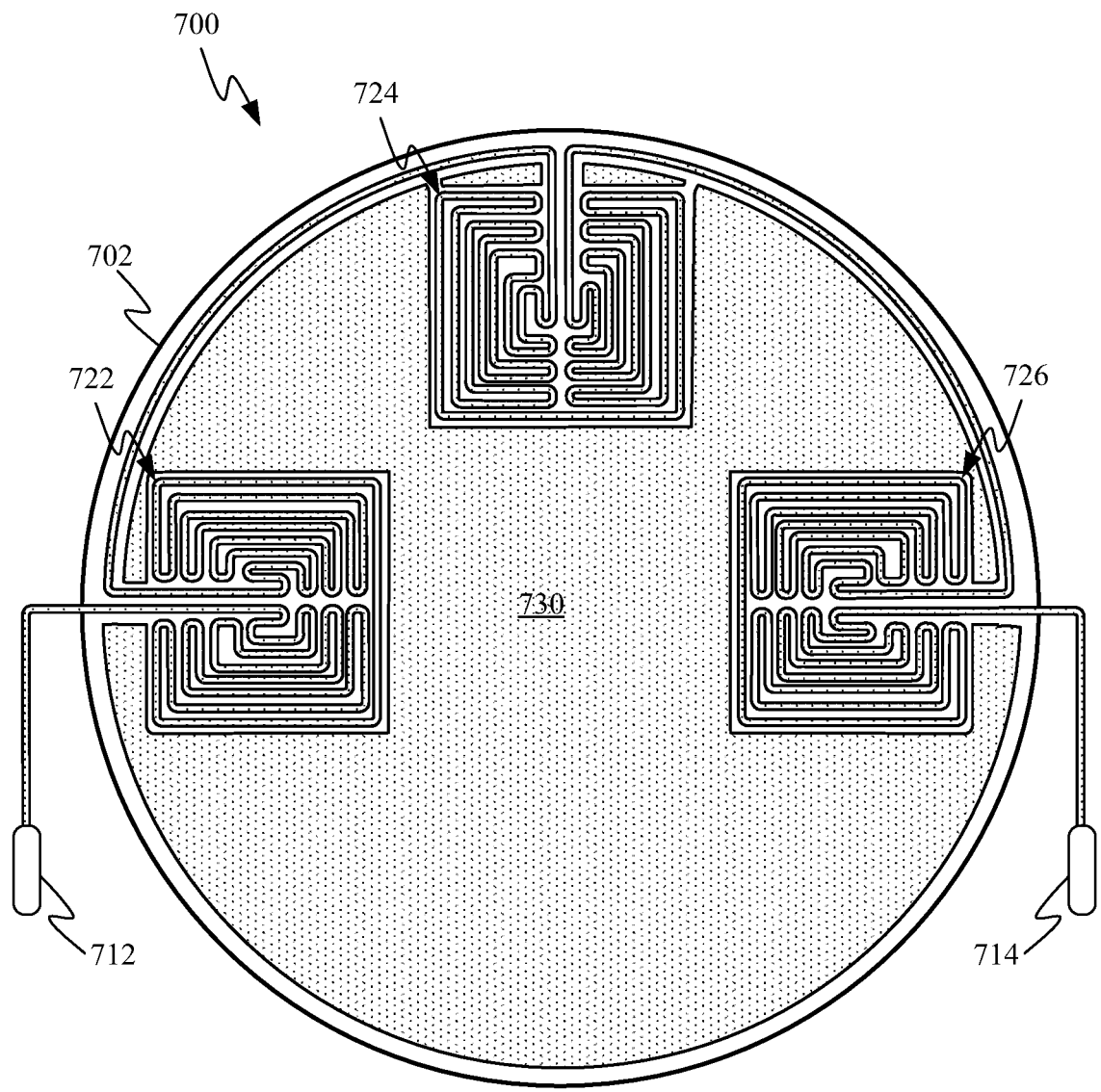
FIG. 7D shows a fourth configuration of light absorbing layer in which an electrically conductive pathway formed by light absorbing layer is concentrated in multiple discrete regions.

FIG. 7D shows a fourth configuration of light absorbing layer 704 in which the electrically conductive pathway formed by light absorbing layer 704 is concentrated in multiple discrete regions 722, 724, and 726 across the interior-facing surface of reaction vessel wall 702. In this embodiment, a central region 730 of light absorbing layer 704 functions only to generate and transfer heat into reaction vessel 700. This configuration can be beneficial as temperature determinations made by measuring the voltage change across electrical pads 712 and 714 can provide a localized temperature determination specific to discrete regions 722, 724, and 726. This can be particularly beneficial where reactions are localized to these particular discrete regions 722, 724, or 726 as energy changes resulting from these reactions can have some localized effect upon temperature of the reaction vessel. FIGS. 6A-6D show examples of specific reactions in which target molecules are affixed to specific locations within a reaction chamber such that reactions occur in predictable location within the reactions chamber. In these types of exemplary reactions patterned thin films can be positioned in the specific locations to allow for more accurate monitoring of the reactions.

In some embodiments, the central region 730 may not include a light absorbing layer. In these embodiments, only the discrete regions 722, 724, and 726 may be include light absorbing layers in these embodiments. These embodiments may operate in a manner similar to the example illustrated in previous figures (e.g., the discrete regions 722, 724, and 726 may be analogous to the discrete regions 302, 304, 306, or the discrete regions 604). In some of these embodiments, each of these discrete regions may be coupled to electrical pads (e.g., similar to the electrical pads 712 and 714 in FIG. 7A) for individually measuring voltage changes and thereby individually calculating temperature at or near each of the discrete regions. In other embodiments, two or more of the discrete regions may be grouped together such that a single voltage change is measured for the grouped discrete regions. For example, a first voltage change may be measured across two discrete regions of a first set (e.g., with a first set of electrical pads), and a second voltage change may be measured across three discrete regions of a second set (e.g., with a second set of electrical pads).

Figure 8:
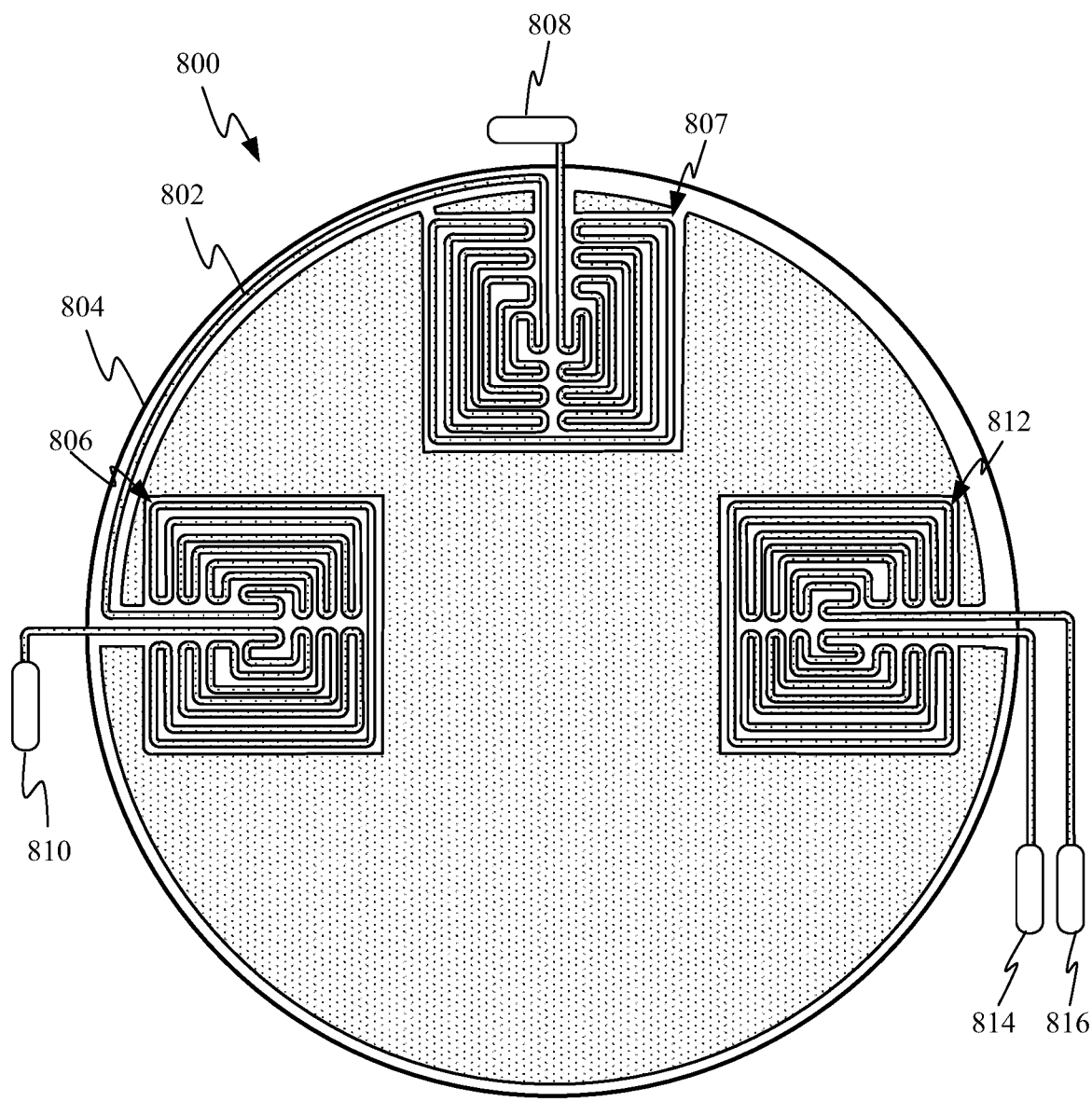
FIG. 8 shows a reaction vessel with a light absorbing layer distributed across a reaction vessel wall.

FIG. 8 shows a reaction vessel 800 with a light absorbing layer 802 distributed across reaction vessel wall 804. Light absorbing layer 802 includes a first electrically conductive pathway localized in two discrete regions 806 and 807 of light absorbing layer 802. This allows for determination of the temperature of discrete regions 806 and 807 by measuring a voltage change between electrical pads 808 and 810. Light absorbing layer 802 includes a second electrically conductive pathway localized in one discrete region 812 of light absorbing layer 802 and allows for determination of a temperature of reaction vessel 800 within discrete region 812 of reaction vessel 800 by measuring a voltage change across electrical pads 814 and 816. Including two different electrically conductive pathways allows for determination of temperature within different portions of reaction vessel 800. This can be particularly helpful in configurations similar to the one shown in FIG. 3B, in which multiple different light sources apply energy to different regions of a reaction vessel.

Separating the electrically conductive pathways also provides a certain amount of thermal isolation that can allow a larger thermal gradient to be applied. For example, first and second light sources could be directed at respective discrete regions 806 and 807 and a third light source could be directed at discrete region 812. This would allow for large differentials in energy input to the three discrete regions and a resulting temperature differential could be tracked due to the presence of the two discrete electrically conductive pathways. In some embodiments a larger number of discrete electrically conductive pathways could be utilized to track a larger number of thermal gradients in different regions of a reaction vessel. For example, the depicted first electrically conductive pathway could be split in two in order to track each of discrete regions 806 and 807 separately. Configurations having as many as four, five, or six or more electrically conductive pathways are also possible and deemed to be within the scope of this disclosure.

Figure 9A:
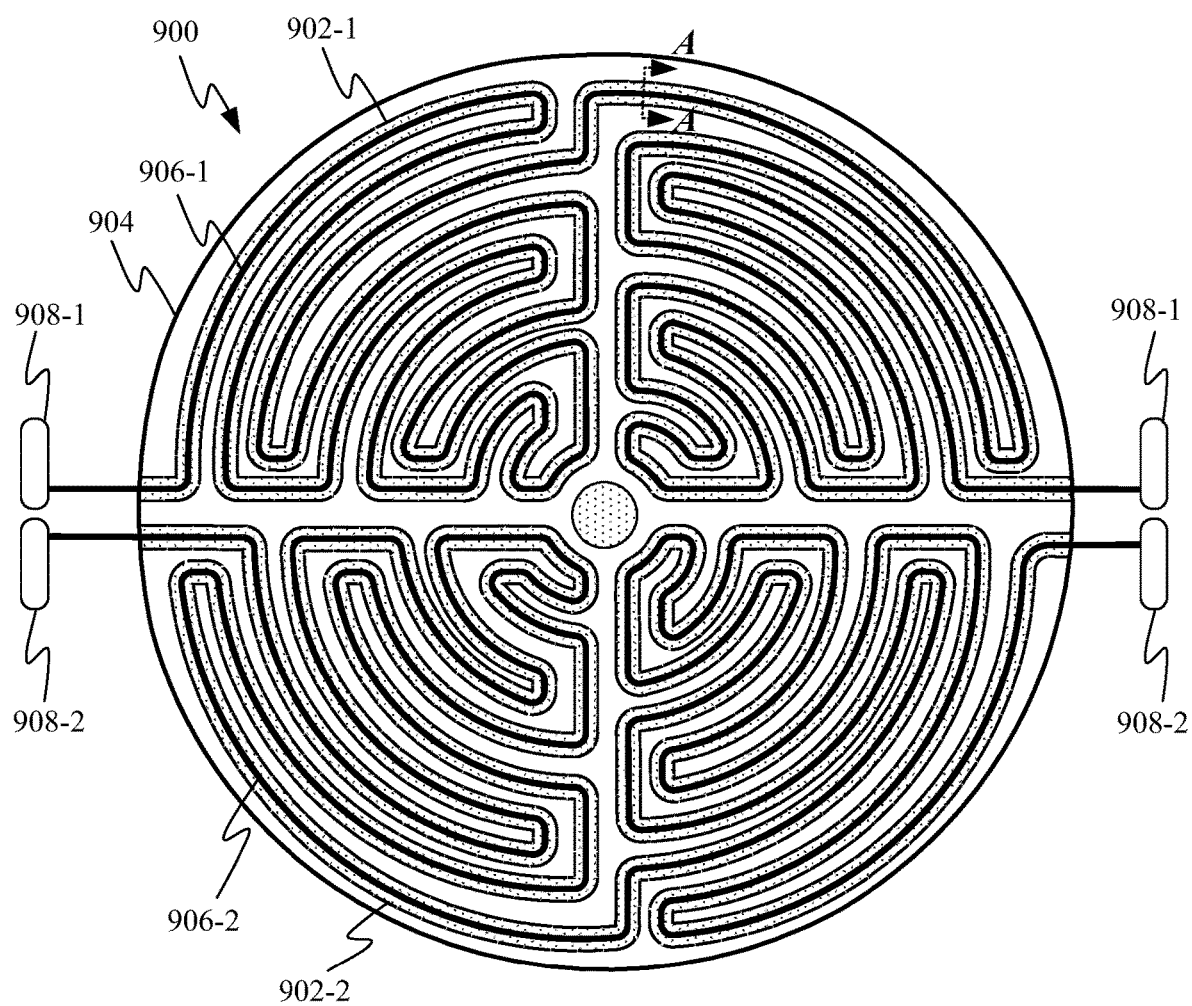
FIG. 9A shows a top view of a portion of a reaction vessel having a light absorbing layer arranged upon a reaction vessel wall.

In some embodiments, a reaction vessel may include electrically conductive pathways that are separate from light absorbing layers. FIG. 9A shows a top view of a portion of an example reaction vessel 900 having a light absorbing layer 902 arranged upon a reaction vessel wall 904. As depicted, light absorbing layers 902-1 and 902-2 form two different electrically conductive pathways covering different portions of reaction vessel wall 904 (e.g., the top half and the bottom half of FIG. 9A). Light absorbing layers 902-1 and 902-2 may be formed from a material known to be efficient at converting photonic energy to heat energy. Electrically conductive pathways 906-1 and 906-2 can be disposed, for example, on top of, beneath, or otherwise adjacent to light absorbing layers 902-1 and 902-2. The electrically conductive pathways 906 can be formed from a material known to have predetermined electrical resistance (e.g., materials including platinum, gold, nickel, copper) and a predictable increase and decrease in electrical resistance due to changes in temperature. Electrical energy can be routed through electrically conductive pathways 906-1 and 906-2 using electrical pads 908-1 and 908-2. As described more fully below, the embodiment illustrated in FIG. 9A enables functional separation between the material utilized as the light absorbing layer to convert photonic energy to heat energy and the material utilized as the electrically conductive pathway. Accordingly, a first material that absorbs heat efficiently, but is highly conductive, can be utilized in conjunction with a second material that is not an efficient heat absorber, but is highly resistive.

Figure 9B:
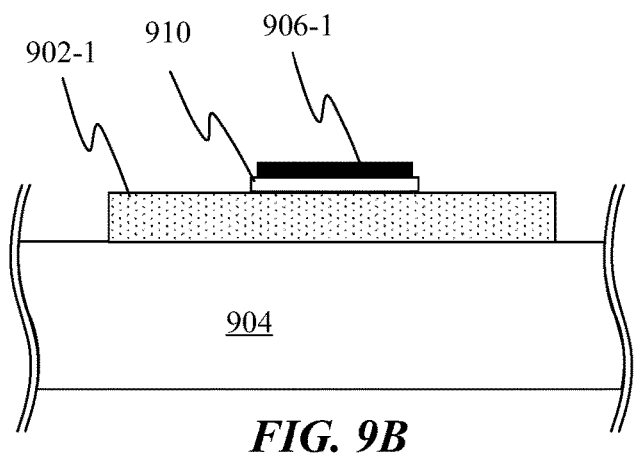
FIG. 9B shows a cross-sectional view of a reaction vessel in accordance with section line A-A of FIG. 9A.

FIG. 9B shows a cross-sectional view of reaction vessel 900 in accordance with section line A-A of FIG. 9A. Although FIG. 9B only illustrates a cross section of a segment along the top half of reaction vessel wall 904, a cross section of a similar segment along the bottom half of the reaction vessel wall 904 may be similar. In particular, FIG. 9B shows how electrically conductive pathway 906-1 can be electrically insulated from light absorbing layer 902-1 by an electrically insulating layer 910. In this way, electrical current received at electrical pads 908-1 through electrically conductive pathway 906-1 can be prevented from being unintentionally conducted to light absorbing layer 902-1. The electrical isolation provided by embodiments of the present invention can be important in obtaining accurate voltage change readings that benefit from the higher electrical resistivity of the material used to form an electrically conductive pathway 906-1. Although FIG. 9B illustrates a particular configuration, with the electrically conductive pathway 906-1 disposed on the electrically insulating layer 910, which is, in turn, disposed on the light absorbing layer 902-1, any suitable configuration is contemplated. For example, the electrically conductive pathway 906-1 may be disposed beneath the electrically insulating layer 910, which may be disposed beneath the light absorbing layer 902-1. In some embodiments, light absorbing layer 902-1 may not be electrically conductive, in which case, the electrically insulating layer 910 may be unnecessary. For example, in these embodiments, electrically conductive pathway 906-1 may be disposed directly on top of, beneath, or adjacent to light absorbing layer 902-1. In some embodiments, electrically conductive pathway 906-1 can be substantially narrower than the segments of light absorbing layer 902-1 upon which it is positioned. This narrow configuration of electrically conductive pathway 906-1 allows portions of light absorbing layer 902-1 to remain exposed so that heat generated within light absorbing layer 902-1 can be conducted directly into solution flowing over and around light absorbing layer 902-1.

As mentioned above with respect to the discussion related to FIG. 7A, it may be advantageous in some cases to have a higher density of the light absorbing layer 704. In some embodiments, a reaction vessel may include one or more light absorbing layers without gaps. In these embodiments, the reaction vessel may include one or more electrically conductive pathways that are separate from the one or more light absorbing layers (similar to the examples discussed above with reference to FIGS. 9A-9B). For example, a reaction vessel may include one or more serpentine electrically conductive pathways similar to those illustrated in FIG. 9A (e.g., electrically conductive pathways 906-1 and 906-2), but may include a single light absorbing layer that spans the entirety of the reaction vessel 900. As another example, a reaction vessel may include one or more serpentine electrically conductive pathways similar to those illustrated in FIG. 9A (e.g., electrically conductive pathways 906-1 and 906-2), but may include two discrete light absorbing regions. In this example, a first discrete light absorbing region may be beneath or atop the electrically conductive pathway 906-1, and a second discrete light absorbing region may be beneath or atop the electrically conductive pathway 906-2.

Figure 10:
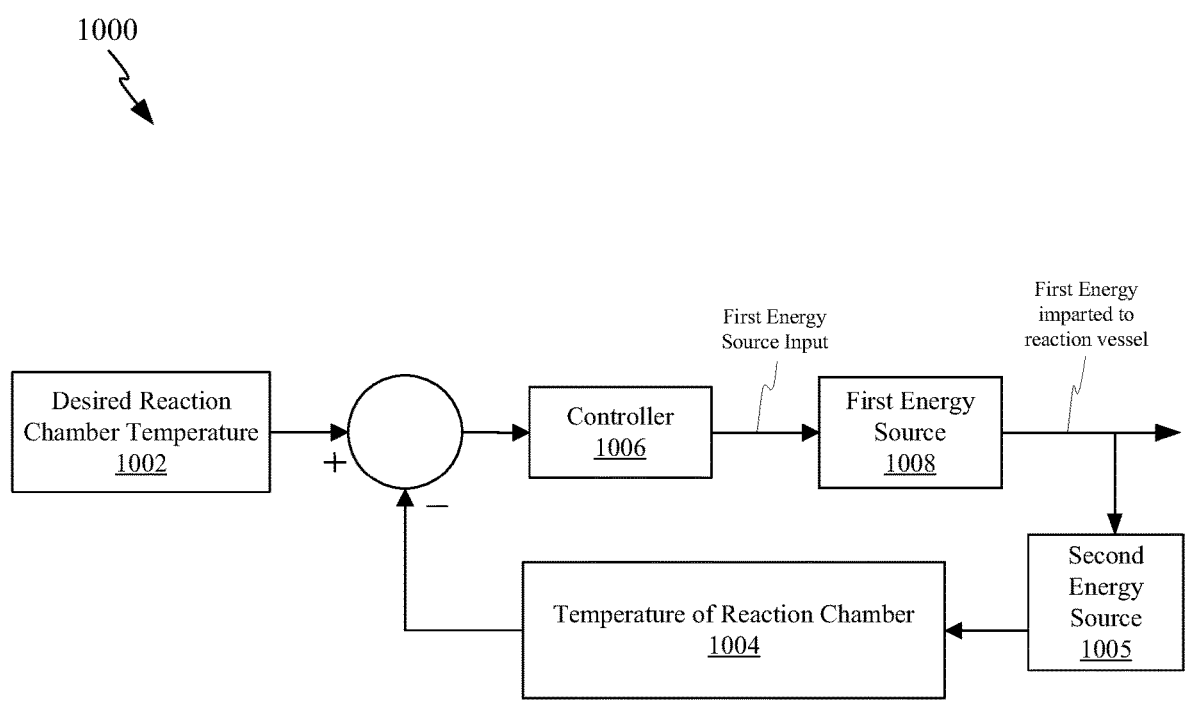
FIG. 10 shows a feedback control loop for modulating the output of a photonic energy source into a reaction vessel based on temperature sensor readings.

FIG. 10 shows a feedback control loop 1000 for modulating output of an energy source (e.g., a photonic energy source) into a reaction vessel. In particular embodiments, the feedback control loop 1000 can receive a desired temperature profile for a reaction chamber of the reaction vessel associated with a particular procedure. For example, a desired reaction chamber temperature 1002 may be determined for a given time. A controller 1006 including one or more processors may be configured to send a first energy source input to a first energy source 1008 for imparting energy to the reaction vessel in order to increase temperature of the reaction vessel. For example, the first energy source 1008 may be a photonic energy source (e.g., an LED). A temperature of the reaction chamber can be monitored by a temperature sensor disposed within the reaction vessel. In some embodiments, as described herein, the temperature sensor can be incorporated into a light absorbing layer that is responsible for transferring heat from a photonic energy source into the reaction chamber. For example, the temperature sensor may measure a voltage change following application of electrical energy by a second energy source 1005 (e.g., an AC source, a battery), for example, to an electrically conductive pathway (e.g., the light absorbing layer). In some embodiments, the temperature sensor can be a discrete sensor not directly associated with a light absorbing layer (e.g., similar to the examples illustrated in FIGS. 9A-9B). The measurements taken by the temperature sensor may be used to derive a temperature of the reaction chamber 1004, which may be subtracted from desired reaction chamber temperature 1002. A controller 1006 may receive the difference between the actual and desired temperature. In some embodiments, the controller 1006 may modulate the photonic energy source input signal transmitted to a first energy source 1008 (e.g., a photonic energy source) to bring the reaction vessel to the desired temperature and/or maintain the the reaction vessel at the desired temperature. Controller 1006 can take many forms including the form of a PI, PD, or PID controller.

Figure 11A:
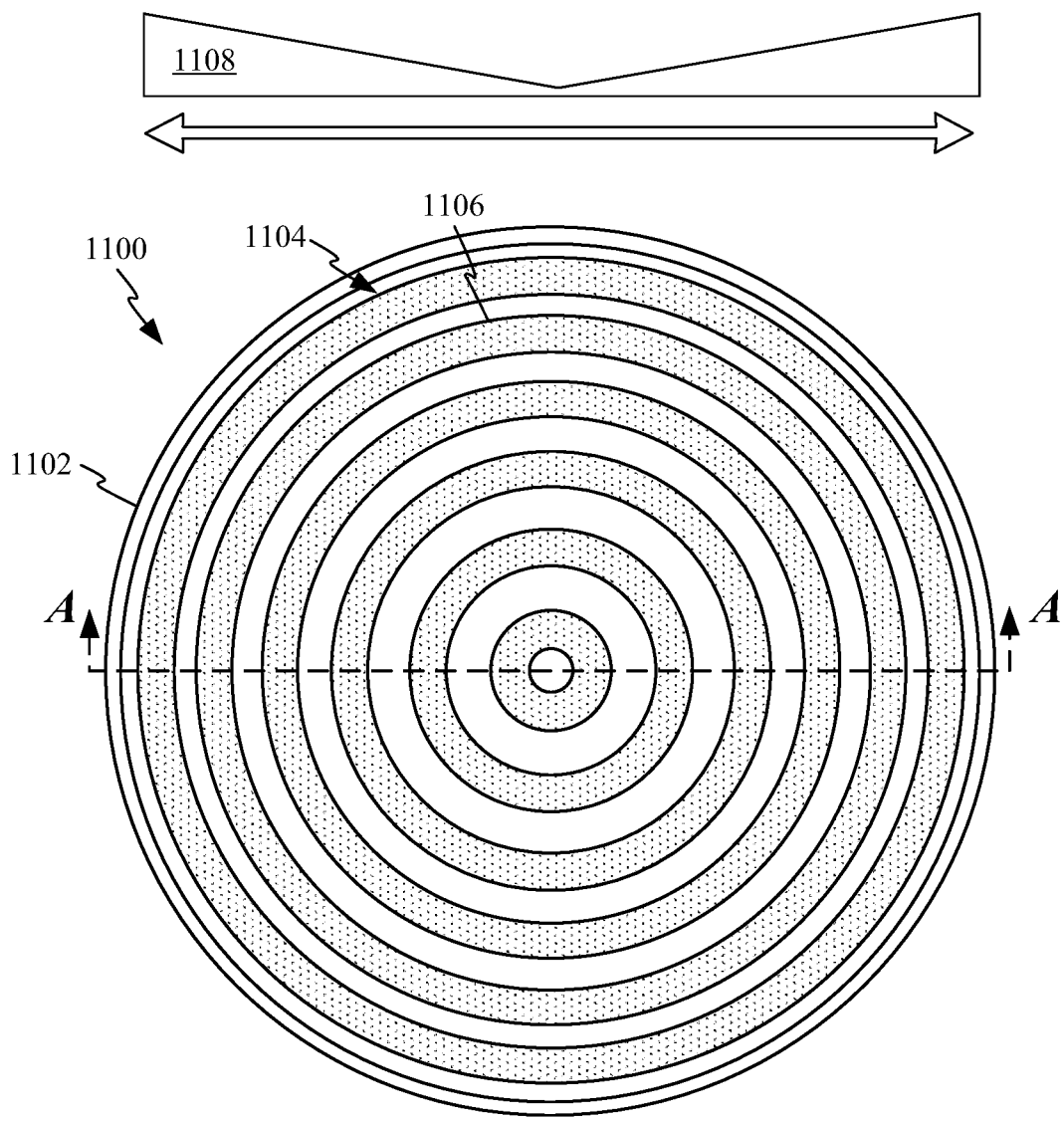
FIGS. 11A-11C show different light absorbing layer configurations formed from a patterned metallic film that include discrete regions arranged so that a density of the light absorbing layer varies across a surface of a reaction vessel wall.
Figure 11B:
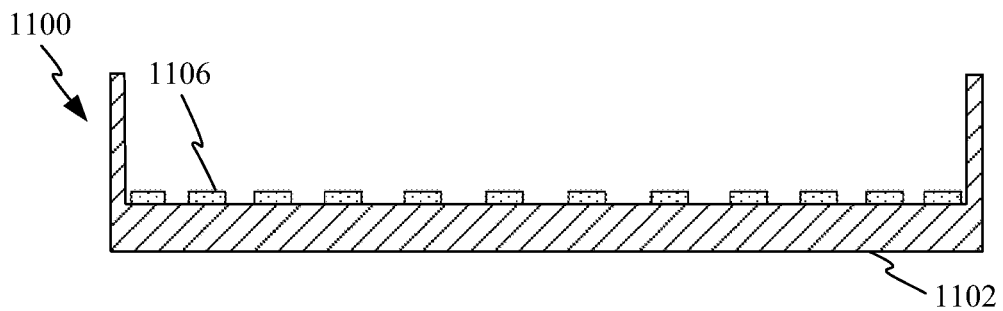
Figure 11C:
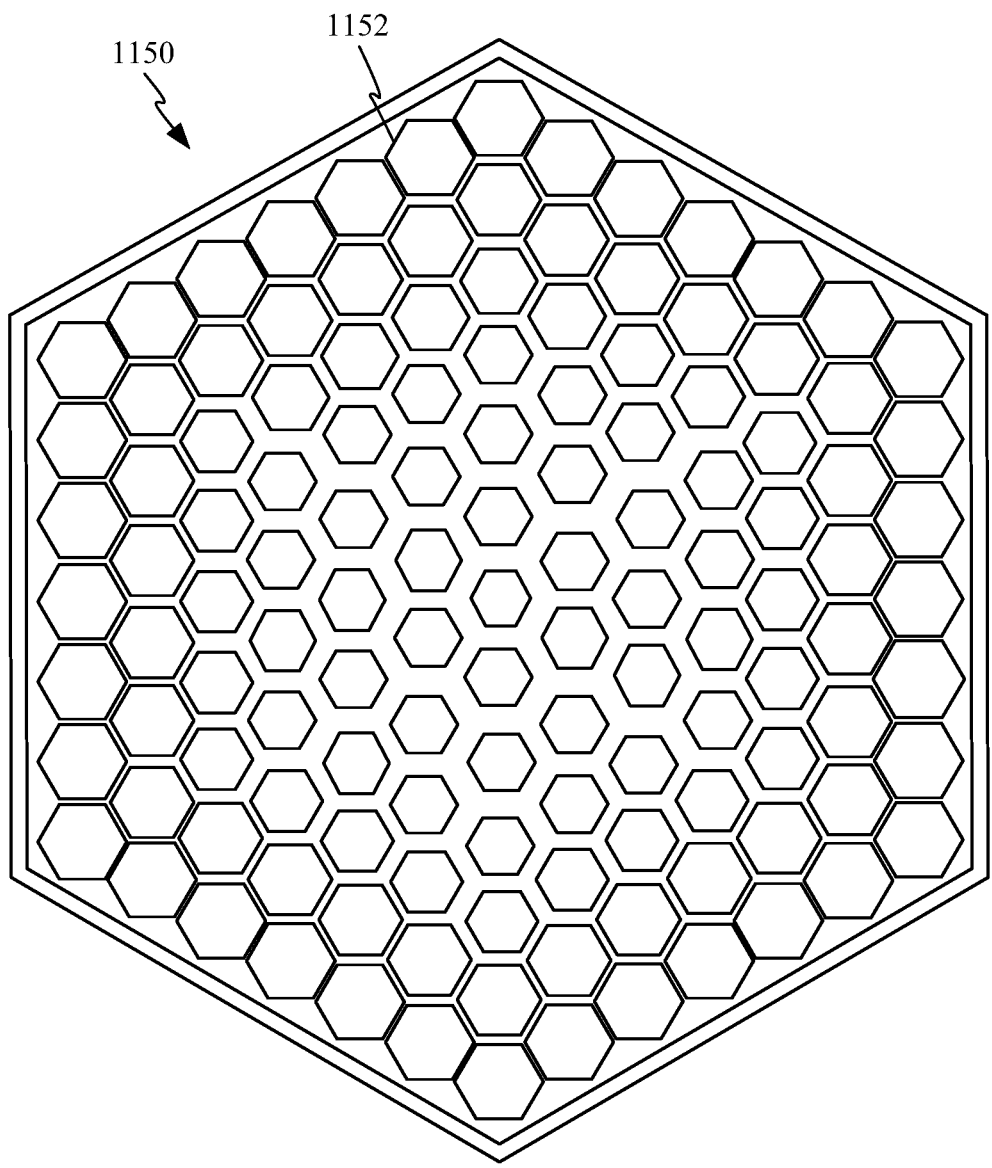

FIGS. 11A-11C show different light absorbing layer configurations formed from patterned metallic film that include discrete regions arranged so that a density of the light absorbing layer varies across a surface of a reaction vessel wall. In particular, FIG. 11A shows a reaction vessel 1100 having a reaction vessel wall 1102 that includes discrete regions of a light absorbing layer 1104 taking the shape of concentric rings 1106. A spacing between the concentric rings can get incrementally larger as the rings get increasingly closer to a central region of light absorbing layer 1104. Density profile 1108 shows an exemplary light absorbing layer density profile indicating how the density of the metallic film making up light absorbing layer can be substantially greater along its peripheral region than in its central region. In this way, a periphery of the light absorbing layer can be more efficient at absorbing and transferring heat into reaction vessel 1100 than a central portion of the light absorbing layer 1104. In some embodiments, this configuration can be beneficial where a light source being directed at the light absorbing layer is more intense at its center than along its periphery. In such a case, reducing the density of light absorbing layer 1104 in the central region and increasing the density of light absorbing layer 1104 it along the periphery can help to normalize an amount of energy introduced across the surface of reaction vessel wall 1102 upon which light absorbing layer 1104 is disposed. This may help make heating uniform across the reaction vessel 1100.

FIG. 11B shows a cross-sectional side view of reaction vessel 1100 in accordance with section line A-A of FIG. 11A. FIG. 11B shows a thickness of the patterned metallic film by illustrating a thickness of the concentric rings 1106 forming the light absorbing layer 1104. FIG. 11B also depicts how a shape of reaction vessel wall 1102 can be substantially flat. This differs from the reaction vessels shown in FIGS. 1A-1B which show concave or graded geometries for the reaction vessel wall. In some embodiments, the concave or graded geometry can perform a similar function as the density gradient of the light absorbing layer by reducing the amount of solution positioned along the periphery of the reaction vessel thereby reducing the amount of heat needing to be sent to the periphery and helping to establish a relatively uniform distribution of heat within reaction vessel 1100. In some embodiments, a density gradient can be used in combination with a slightly concave geometry for a reaction vessel wall to achieve an even distribution of heat within the reaction vessel.

FIG. 11C shows an alternative variable density light absorbing layer configuration for a reaction vessel 1150 in which hexagonal discrete regions 1152 of a light absorbing layer take the form of hexagonal discrete regions. At the outer periphery of the light absorbing layer the hexagonal discrete regions 1152 are only separated very slightly. The hexagonal discrete regions 1152 are then separated by incrementally greater distances towards the central region of a reaction vessel wall. A size of the discrete hexagonal regions can also be reduced towards the central region to help facilitate the larger gaps between the discrete regions. It should be appreciated that while the hexagonal shape does facilitate an efficient spacing of the discrete regions, other shapes for the discrete regions are possible and deemed to be within the scope of the disclosure. For example, rectangular, triangular, or even curved non-polygonal shapes are possible. FIG. 11C shows how a geometry of the reaction vessel itself can have a non-circular/non-rectangular geometry well suited for accommodating a size and shape of the discrete regions of the light absorbing layer. Furthermore, reaction vessels in general can have other shapes and sizes as needed to help facilitate uniform distribution of heat within the reaction vessel.

Figure 11D:
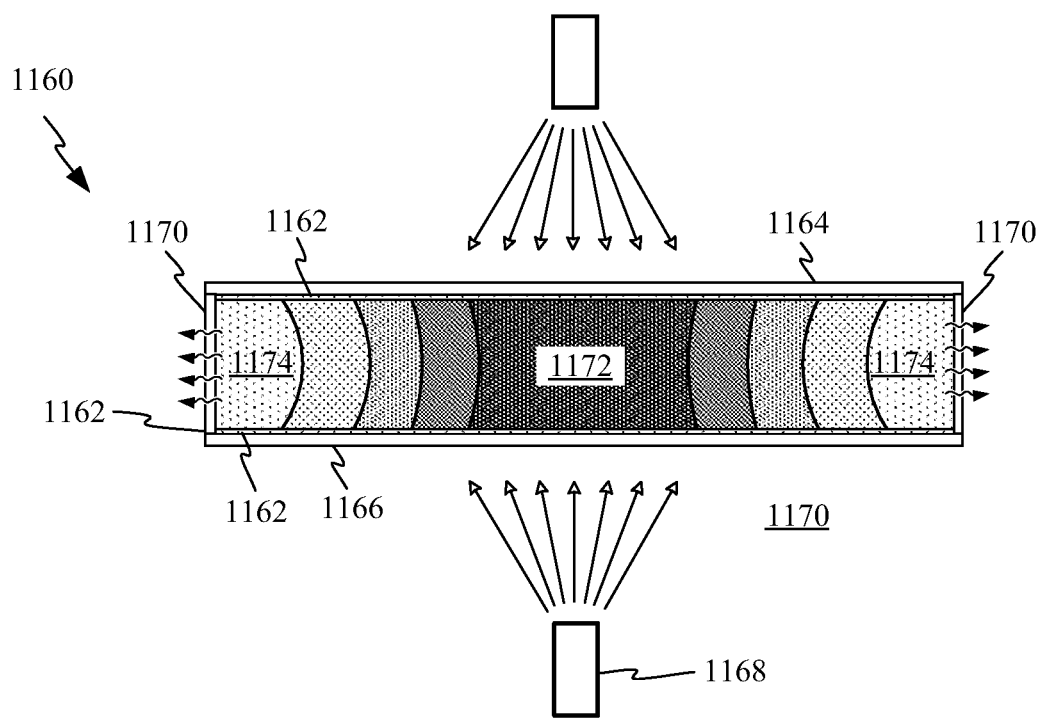
FIGS. 11D-11E show exemplary side views of a distribution of heat within reaction vessels using conventional light absorbing layers and patterned light absorbing layers.
Figure 11E:
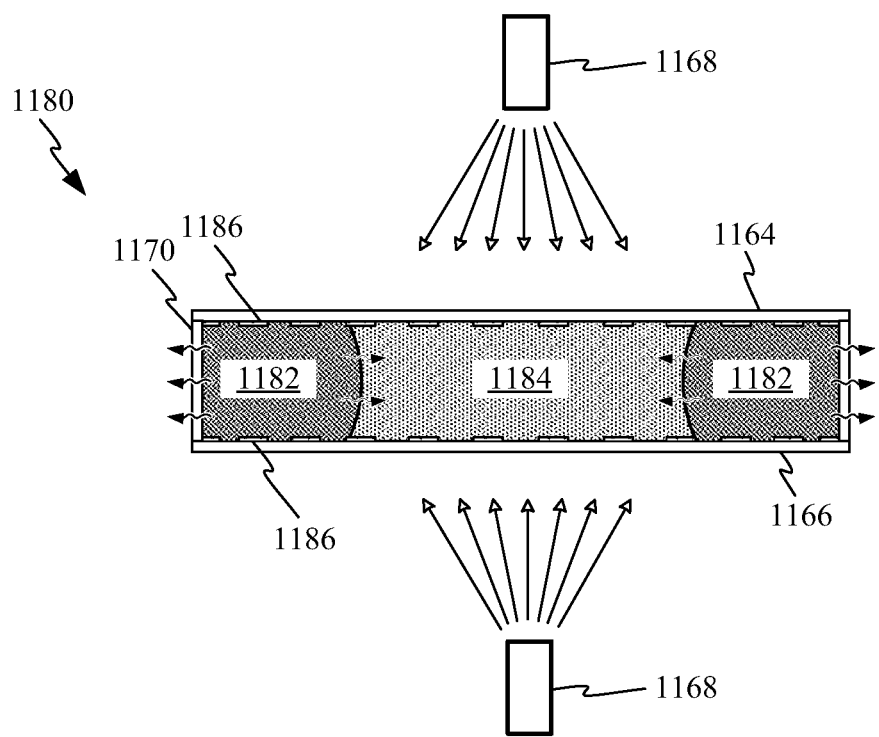

FIG. 11D-11E show exemplary side views of a distribution of heat within reaction vessels using conventional light absorbing layers and patterned light absorbing layers. FIG. 11D shows an interior portion of a reaction vessel 1160 including light absorbing layers 1162 on interior-facing surfaces of both an upper reaction vessel wall 1164 and a lower reaction vessel wall 1164 of reaction vessel 1160. Light absorbing layers 1162 can take the form of solid layers of metallic film. FIG. 11D also shows how when energy sources 1168 illuminate light absorbing layers 1162 an uneven distribution of heat builds up within reaction vessel 1160. This uneven distribution of heat occurs because heat is injected substantially evenly across upper and lower reaction vessel walls 1164 and 1166 of reaction vessel 1160 and the heat being added is only able to escape reaction vessel 1160 through lateral walls 1170 of reaction vessel 1160. This results in central region 1172 being the warmest region and the dot patterns indicate how the heat gradually drops until reaching its lowest temperature in peripheral region 1174 of reaction vessel 1160 due to the dissipation of the heat through lateral walls 1170. This highly varied distribution of heat can be undesirable where a more uniform distribution of heat is desired.

FIG. 11E shows how patterned light absorbing layers 1186 can be adhered to upper and lower reaction vessel walls 1164 and 1166 of reaction vessel 1180. Patterned light absorbing layers 1182 can have a varied density that results in a larger amount of heat being applied to peripheral regions 1182 than to a central region 1184. For example, there may be a higher density of discrete regions of the light absorbing layer 1186 at the peripheral regions 1182 than at the central region 1184. In some embodiments, a similar result may be effected by varying the properties of the light absorbing layer 1186 across the reaction vessel 1180. For example, the composition of the light absorbing layer 1186 may be varied across the reaction vessel (e.g., discrete regions of the light absorbing layer 1186 along the peripheral regions 1182 may be composed of material that absorbs more light energy than discrete regions along the central region 1184). As another example, the thickness of the discrete regions of the light absorbing layer 1186 may be varied (e.g., discrete regions of the light absorbing layer 1186 may be thicker along the peripheral regions 1182). This configuration of light absorbing layers 1182 can be similar to or the same as the light absorbing layer configurations depicted in FIGS. 11A and 11C. The use of this varied density light absorbing layer configuration results in heat transferring out of the peripheral region 1182 in two different directions. A first portion of the heat is conducted into central region 1184 and a second portion of the heat escapes the reaction vessel through lateral walls 1170 of reaction vessel 1180. In this way, a thermal gradient within reaction vessel can be normalized even though heat still escapes reaction vessel 1180 through lateral walls 1170. While FIG. 11E does depict a slight thermal gradient between central region 1184 and peripheral region 1182, it should be noted that in some embodiments, this configuration or a similar one can result in little to no variation in temperature within reaction vessel 1180.

Figure 12:
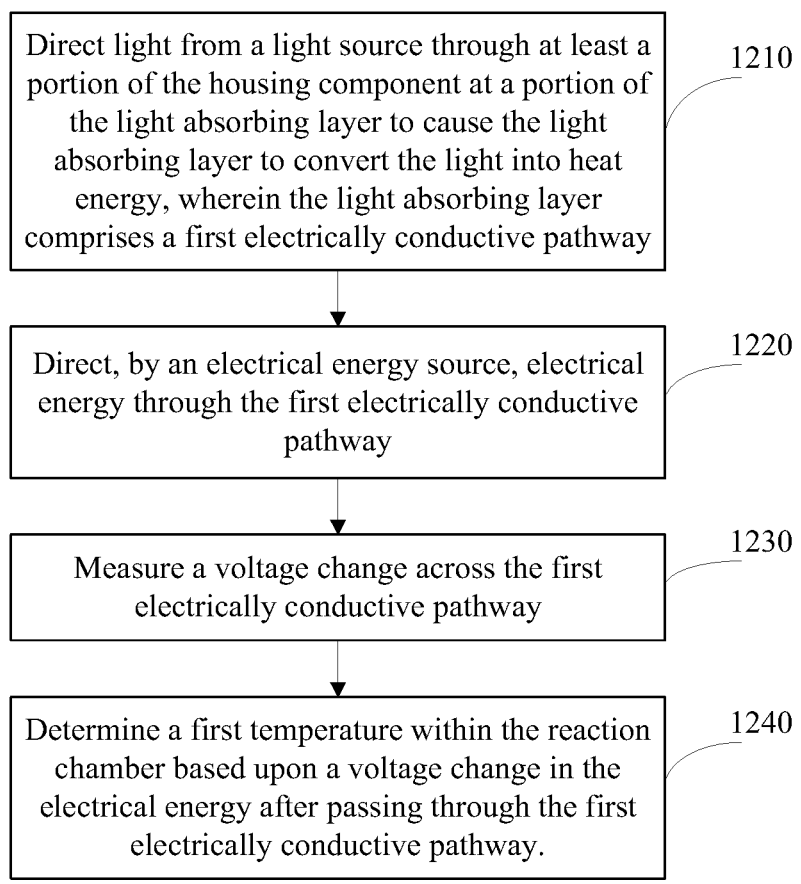
FIG. 12 shows an example method for operating a reaction vessel assembly.

FIG. 12 shows an example method 1200 for operating a reaction vessel assembly. The method may include, at step 1210, directing light from a light source through at least a portion of the housing component at a portion of the light absorbing layer to cause the light absorbing layer to convert the light into heat energy, wherein the light absorbing layer comprises a first electrically conductive pathway. At step 1220, the method may include directing, by an electrical energy source, electrical energy through the first electrically conductive pathway. In some embodiments, the electrical energy is directed through an entirety of the light absorbing layer. At step 1230, the method may include measuring a voltage change across the first electrically conductive pathway. At step 1240, the method may include determining a first temperature within the reaction chamber based upon a voltage change in the electrical energy after passing through the first electrically conductive pathway. In some embodiments, the method may further include a calibration step for more accurately correlating temperatures to voltage changes so that accurate temperatures for the reaction chamber may be determined. For example, the reaction chamber may be brought to one or more known temperatures (e.g., as independently measured using separate temperature sensors), and voltages may be measured. The measured temperatures and voltages may be used to, for example, create a lookup table or otherwise generate a function for determining temperatures within the reaction chamber from a measured voltage. In some embodiments, the method may further include determining that the first temperature is equal to or greater than a desired temperature; and in response to said determination, causing the light source to stop directing light at, or decrease an amount of light directed at, the portion of the light absorbing layer. For example, the processor may determine that the first temperature is equal to or greater than the desired temperature. In response, the processor may cause the light source to stop directing light at the portion of the light absorbing layer. Alternatively, the processor may decrease an amount of light directed at the portion of the light absorbing layer (e.g., by decreasing power supplied to the light source). As another example, the processor may determine that the first temperature is less than the desired temperature, and in response may increase an amount of light directed at the portion of the light absorbing layer.

In some embodiments, the light absorbing layer may be disposed along the surface of the housing component at a variable density. In some embodiments, the light absorbing layer is disposed at a relatively high density along a peripheral portion of the surface of the housing component, and at a relatively low density along a central portion of the surface of the housing component. In some embodiments, the light absorbing layer is disposed at a relatively low density along a peripheral portion of the surface of the housing component, and at a relatively high density along a central portion of the surface of the housing component.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for operating a reaction vessel assembly, including the particular steps of the method of FIG. 12, this disclosure contemplates any suitable method for operating a reaction vessel assembly, including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A reaction vessel assembly, comprising:
   a reaction vessel, comprising:
      a housing component;
      a reaction chamber defined by the housing component;
      a light absorbing layer conforming to a portion of an interior-facing surface of the housing component that defines the reaction chamber, the light absorbing layer comprising a first electrically conductive pathway;
      a first electrical pad coupled to the first electrically conductive pathway; and
      a second electrical pad coupled to the first electrically conductive pathway;
   a light source configured to direct light through at least a portion of the housing component at a portion of the light absorbing layer; and
   an electrical energy source configured to apply a voltage between the first electrical pad and the second electrical pad and across the first electrically conductive pathway to measure a voltage change between the first electrical pad and the second electrical pad to determine a temperature of the reaction vessel.

2. The reaction vessel assembly of claim 1, further comprising a processor configured to determine a first temperature within the reaction chamber based upon the voltage change between the first electrical pad and the second electrical pad, wherein a resistance of the first electrically conductive pathway is correlated with the first temperature within the reaction chamber based on the voltage change.

3. The reaction vessel assembly of claim 2, wherein the voltage is applied through an entirety of the light absorbing layer.

4. The reaction vessel assembly of claim 2, wherein the processor is further configured to:
compare the first temperature to a desired temperature; and
in response to a result of said comparison, cause the light source to adjust an amount of light directed at the portion of the light absorbing layer.

5. The reaction vessel assembly of claim 1, wherein the light absorbing layer comprises a first layer in direct contact with the housing component and a second layer stacked atop the first layer that forms the first electrically conductive pathway, wherein the first layer is electrically insulated from the second layer.

6. The reaction vessel assembly of claim 5, wherein the first layer is electrically non-conductive.

7. The reaction vessel assembly of claim 1, further comprising a second electrically conductive pathway separate and distinct from the first electrically conductive pathway.

8. The reaction vessel assembly of claim 7, wherein the first electrically conductive pathway covers a first portion of the housing component and the second electrically conductive pathway covers a second portion of the housing component, and wherein the reaction vessel assembly further comprises a processor configured to determine a temperature of the first and second portions of the housing component based on respective measured voltage changes in electrical energy after passing through the first and second electrically conductive pathways.

9. The reaction vessel assembly of claim 1, wherein the first electrically conductive pathway has a serpentine geometry in which adjacent segments of the first electrically conductive pathway are separated by a gap less than half as wide as a width of each of the adjacent segments of the first electrically conductive pathway.

10. The reaction vessel assembly of claim 1, wherein the light absorbing layer is disposed along the surface of the housing component at a variable density.

11. The reaction vessel assembly of claim 10, wherein the light absorbing layer is disposed at a relatively high density along a peripheral portion of the surface of the housing component, and at a relatively low density along a central portion of the surface of the housing component.

12. The reaction vessel assembly of claim 10, wherein the light absorbing layer is disposed at a relatively low density along a peripheral portion of the surface of the housing component, and at a relatively high density along a central portion of the surface of the housing component.

13. The reaction vessel assembly of claim 10, wherein the light absorbing layer comprises two or more discrete regions.

14. A method of operating a reaction vessel assembly comprising a reaction vessel including a reaction chamber defined by a housing component, the method comprising:
directing light from a light source through at least a portion of the housing component at a portion of the light absorbing layer to cause the light absorbing layer to convert the light into heat energy, wherein the light absorbing layer comprises a first electrically conductive pathway, wherein a first electrical pad is coupled to a first end of the first electrically conductive pathway and a second electrical pad is coupled to a second end of the first electrically conductive pathway;
applying, by an electrical energy source, a voltage between the first electrical pad and the second electrical pad and across the first electrically conductive pathway;
measuring a voltage change across the first electrically conductive pathway between the first electrical pad and the second electrical pad; and
determining a first temperature within the reaction chamber based upon the voltage change across the first electrically conductive pathway.

15. The method of claim 14, wherein the voltage is applied through an entirety of the light absorbing layer.

16. The method of claim 14, further comprising:
comparing the first temperature to a desired temperature; and
in response to a result of said comparison, causing the light source to adjust an amount of light directed at the portion of the light absorbing layer.

17. The method of claim 14, wherein the light absorbing layer is disposed along the surface of the housing component at a variable density.

18. The method of claim 17, wherein the light absorbing layer is disposed at a relatively high density along a peripheral portion of the surface of the housing component, and at a relatively low density along a central portion of the surface of the housing component.

19. The method of claim 17, wherein the light absorbing layer is disposed at a relatively low density along a peripheral portion of the surface of the housing component, and at a relatively high density along a central portion of the surface of the housing component.

20. A reaction vessel assembly, comprising: a reaction vessel, comprising: a reaction chamber; and a light absorbing layer disposed along the reaction chamber, the light absorbing layer comprising a first electrically conductive pathway; a light source configured to direct energy at a portion of the light absorbing layer; an electrical energy source configured to apply a voltage to the first electrically conductive pathway; and a processor configured to: determine a first temperature within the reaction chamber based upon a voltage change across the first electrically conductive pathway; determine that the first temperature is equal to or greater than a desired temperature; and in response to said determination, cause the light source to stop directing energy at the portion of the light absorbing layer.

* * * * *